(12) United States Patent
Amron

(10) Patent No.: US 11,253,768 B1
(45) Date of Patent: Feb. 22, 2022

(54) COMBINATION SYSTEMS AND METHODS OF SAFE LASER LINES FOR DELINEATION DETECTION, REPORTING AND AR VIEWING

(71) Applicant: Q Experience LLC, Miami, FL (US)

(72) Inventor: Alan B Amron, Miami, FL (US)

( * ) Notice: Subject to any disclaimer, the term of this patent is extended or adjusted under 35 U.S.C. 154(b) by 0 days.

(21) Appl. No.: 17/329,392

(22) Filed: May 25, 2021

Related U.S. Application Data

(60) Provisional application No. 63/199,887, filed on Jan. 30, 2021.

(51) Int. Cl.
*A63B 71/06* (2006.01)

(52) U.S. Cl.
CPC .. *A63B 71/0619* (2013.01); *A63B 2071/0658* (2013.01); *A63B 2220/05* (2013.01); *A63B 2220/805* (2013.01); *A63B 2243/0025* (2013.01)

(58) Field of Classification Search
CPC .......... G01C 15/004; A63B 2071/0658; A63B 2220/05; A63B 2220/805; A63B 2243/0025
See application file for complete search history.

(56) References Cited

U.S. PATENT DOCUMENTS

| | | | | |
|---|---|---|---|---|
| 5,798,519 A | * | 8/1998 | Vock | A63B 24/0003 250/206.1 |
| 6,135,456 A | * | 10/2000 | Cooper | A63B 67/002 273/371 |
| 6,609,307 B1 | * | 8/2003 | Haynes | A63D 15/005 33/227 |
| 7,770,297 B1 | * | 8/2010 | Sommerfeld | A63B 71/0605 33/289 |
| 9,398,213 B1 | * | 7/2016 | Cronin | A63B 71/0605 |
| 9,433,849 B1 | * | 9/2016 | Brown | A63B 71/0605 |
| 9,656,154 B1 | * | 5/2017 | Rodriguez | A63C 19/065 |
| 10,553,124 B2 | * | 2/2020 | Acree | G09B 7/02 |
| 2002/0122115 A1 | * | 9/2002 | Harmath | A63B 71/0605 348/157 |
| 2004/0111905 A1 | * | 6/2004 | Amron | G01C 15/004 33/289 |
| 2005/0162257 A1 | * | 7/2005 | Gonzalez | A63B 71/0605 340/323 R |
| 2012/0262365 A1 | * | 10/2012 | Mallinson | G06F 3/0325 345/156 |
| 2013/0120581 A1 | * | 5/2013 | Daniels | H04N 21/23418 348/157 |
| 2014/0340487 A1 | * | 11/2014 | Gilliland | G01S 7/4863 348/48 |
| 2018/0017679 A1 | * | 1/2018 | Valouch | H01L 31/0224 |
| 2018/0185724 A1 | * | 7/2018 | Lalaoua | A63B 71/0622 |
| 2018/0200602 A1 | * | 7/2018 | Simon Vilar | G06K 9/00724 |
| 2019/0157470 A1 | * | 5/2019 | Send | H01L 31/1055 |
| 2019/0160356 A1 | * | 5/2019 | Lalaoua | A63B 71/0669 |
| 2020/0197772 A1 | * | 6/2020 | Browning, Jr. | A63B 67/002 |

* cited by examiner

*Primary Examiner* — Reginald A Renwick
(74) *Attorney, Agent, or Firm* — Christopher J. VanDam, PA; Chris Van Dam

(57) ABSTRACT

A sports detection and reporting system that locates the players and the ball to determined if certain play criteria have been met. The system also displays on the field detected locations relevant to the players and the play in real time.

12 Claims, 25 Drawing Sheets c 2021 First Down Line - Goal Line – Goal Posts – Knees – Ball hits ground - Detection systems

Fig. 23

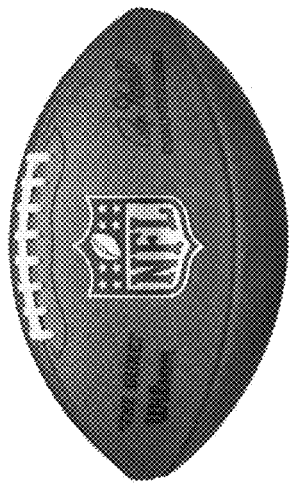

NEW    X RAY FOOTBALL TRACKER™
©2021 United States patent pending First Began Jones this Company

First downs, touch downs, fair catches and splitting the uprights on kicks are now all called accurately.

If any portion of the football touches the ground, breaks the first down line marker, (as continually moved & marked on the field, in the computer grid) or breaks any part of the goal line, it's reported in real-time to the referee on the field and the officials in the booth.

The inside covering of the football, is a thin line painted 360 degrees with a net weight, no change of balance, safe radioactive trackable material. Any portion of the ball is be tracked on the football field computer grid, to within 1/16" of inch accuracy. To coordinate with the X-ray sensor w trackers on the players, the first down line to gain placement on each play, the goal line on the field and the goal posts for kicks.

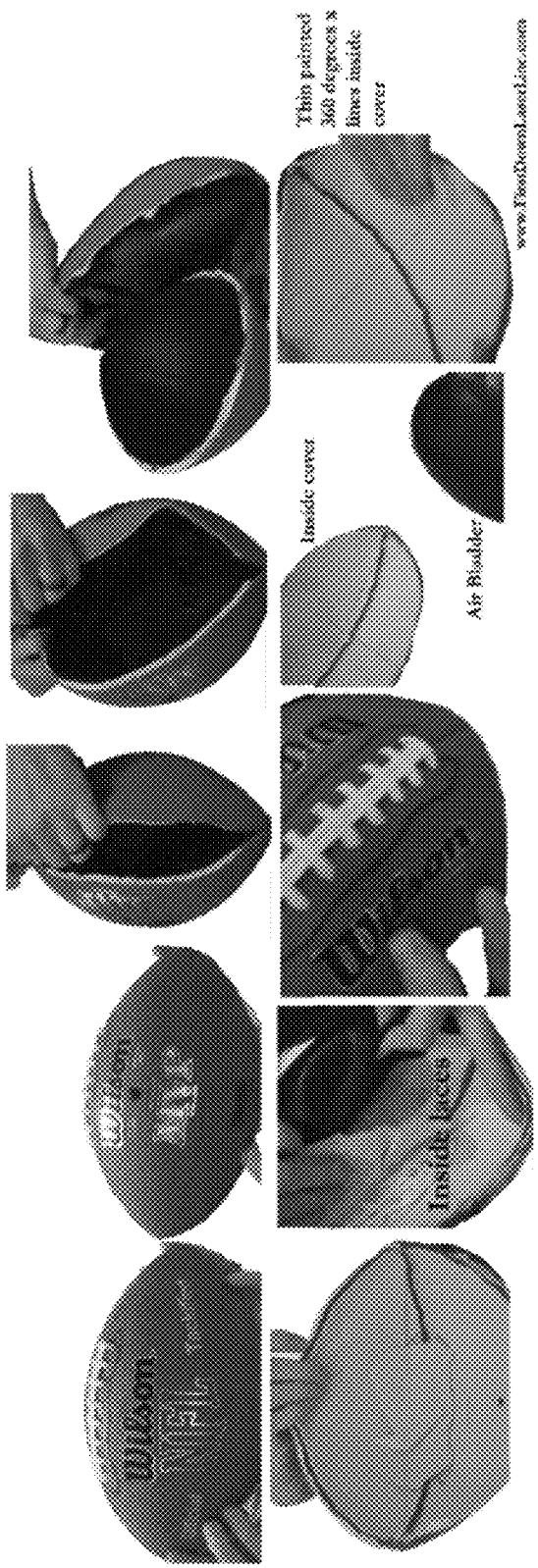

COMBINATION SYSTEMS AND METHODS OF SAFE LASER LINES FOR DELINEATION DETECTION, REPORTING AND AR VIEWING

CROSS-REFERENCES TO RELATED APPLICATIONS

The present application claims benefit to U.S. provisional patent application 63/199,887 filed on Jan. 30, 2021, which is hereby incorporated by reference.

STATEMENT REGARDING FEDERAL SPONSORED RESEARCH OR DEVELOPMENT

None.

NAMES OF PARTIES TO A JOINT RESEARCH AGREEMENT

None.

REFERENCE TO A "SEQUENCE LISTING", A TABLE, OR A COMPUTER PROGRAM LISTING APPENDIX SUBMITTED ON COMPACT DISC AND INCORPORATION-BY-REFERENCE OF THE MATERIAL ON THE COMPACT DISCLOSURE

None.

STATEMENT REGARDING PRIOR DISCLOSURES BY AN INVENTOR OR JOINT INVENTOR

None.

BACKGROUND OF THE INVENTION

1. Field of the Invention

The present invention relates generally to the combination of control safe projection of visible lines and other useful but temporary markings onto a surface and, more particularly, to safe systems employing one or more lasers to project such markings upon a surface for delineation. Detection, reporting and controlling methods as well as Augmented Reality alternative method of viewing a first down line on the field.

2. Description of Related Art Including Information Disclosed Under 37 CFR 1.97 and 37 CFR 1.98

A number of popular and widely televised outdoor sporting and athletic events rely upon boundary markings and/or measurements by which to measure the performance of one competitor or team against the competition. Examples of the former include tennis and soccer, which are both played outdoors—often during the daytime in conditions which can vary from brightly lit to overcast. Examples of the latter include many track and field events familiar to spectators of the Summer Olympics. By way of illustration, distance measurements are utilized in such events as the shot put, the discus and javelin throws, and even the long and broad jumps. After each athlete performs, the applicable distance is measured and recorded for later comparison to the athlete's own prior performances, the performances of the other athletes, and even to the current world record for the event.

Augmented Reality in the past generally focuses on stagnate, none moving. This is a moving updated positioning of a single first down yellow graphic line appearing virtually to be on the field of play. To use to know where the line to gain is located at any given moment in time.

Distance measurements are also critical to the conduct of the game of football. In football, a key objective of the team in possession of the ball (i.e., the "offense") is to retain possession of that ball by moving it far enough down the field. Specifically, the offense is given a set of four plays or "downs" to advance the ball by at least ten yards. Each time that distance is reached or exceeded, the offense is said to have crossed a "first down" line, a new set of downs is earned, and the offense is allowed to continue its advance toward the goal line of the opposing team (i.e., the "defense"). If the offense falls short, however, possession is lost and the two teams reverse their roles. A regulation football field has a length of 100 yards and width of 53.3 yards. Thus, by way of example, a team gaining possession of the ball at its own 20-yard line must move the ball a total of eighty yards in order to reach the end zone of the opposing team. In addition to the First Down, there are other ball placement needs by way of a thinner "line up line" projected at the forward progress of each play. A knee down before forward progress also must be detected, for if the knee is down after the forward progress it's then allowed. During kicks to gain points, the goal posts are not high enough for the officials to see if the ball makes it within the up rights, therefore a detection system must also be installed straight up towards the sky, to determine if the ball is kicked within the uprights or not. When a player catch's a ball, if that ball hits or even touches the ground, it's not a catch. We will detect from sensors in the knees of all the players carrying the ball, and the paint sensors in the ball itself, to see the sequence of events that take place. Knee down before catching the ball, or after catching the ball. It is only a good catch if the ball is caught before the knee hits the ground. The control of these features will be explained within the follow text.

In numerous occasions throughout an average football game, the officials of the game and the players must resort to sideline markers to establish whether the offense has advanced the ball by the required distance. The standard alignment system that is utilized is generally a pair of poles connected by a 30-foot-long chain. The relative position of the football is measured by locating a first of these poles at the approximate location of the initial line of scrimmage and moving the second as far forward as possible. Each time this measurement is made, the game must be delayed and the yard markers must be carried from the sidelines to the place on the field where the official has "spotted" the ball. Although the game of football has become a relatively complex sport, involving literally hundreds of millions of invested dollars, this time-consuming system has remained relatively the same since the conception of the sport. Use of the chains cause not only delay in the game, but non-accurate ball placement as well. The advantage of our accurate ball placement, thinner 1" laser "line up line", as part of our new combination first down laser line system.

Example: NFL™ today with no line;
First down from the 32
Runner tackled at the 35 near the sideline after gaining 3 yards
Linesman puts his foot down where the runner was tackled, tosses ball to another official who tosses it to another official. This official then looks 20 yards across the field to see where the original linesman foot is & places the ball (approximately) where the foot is.

Example: NFL™ with the laser line;
First down from the 32. The first down laser line is at the 42
Runner tackled at the 35 near the sideline after gaining 3 yards
Linesman puts his foot down where the runner was tackled, our thinner line up laser line automatically moves to the linesman's foot showing the exact position where the runner was tackled. The linesman tosses ball to another official who tosses it to another official. This official then places the ball at the thinner line up laser line at the exact spot marked by the original linesman. The laser line up line then automatically shuts off.

Television networks have recently implemented an image pre-processing system which allows viewers of televised football games to see a so-called "virtual" first down line that digitally projects, in real time, a visible line onto video frames recorded by the television camera, the line being displayed on a viewer's television set so that it appears to extend between the first down sideline markers. Unfortunately, neither the players, game officials, nor the fans attending such games can actually see this virtual line. Similar virtual markings have been used to show television viewers whether a tennis ball landed in the service box or within the court boundaries and as an aid to the official review process for that sport. It is evident that virtual projection systems do nothing to enhance the experience of the spectators who actually attend the events. Indeed, the lack of a real-world equivalent may very well detract from the experience of those fans who are accustomed to seeing these markings on television. With our augmented reality method glasses, lenses and goggles version everyone in the stadium wearing these AR glasses can see the yellow line graphic line appearing to be right on the field itself, like if at home watching it on TV. Now with my augmented reality method of operation, everyone in the stadium wearing them will be able to see that broadcasted yellow first down line graphic, and as it re positions and moves up and down the field.

The inventor herein has previously proposed several different systems and methods for projecting a visible reference light onto an athletic field. None have included a combination of safe projection of a laser lines system laser line up line and detection and reporting systems and methods of augmented reality visible like on television broadcast yellow line as described herein.

A brief abstract of the technical disclosure in the specification and title are provided as well for the purposes of complying with 37 CFR 1.72 and are not intended to be used for interpreting or limiting the scope of the claims.

Without limiting the scope of the invention, a brief summary of some of the claimed embodiments of the invention is set forth below. Additional details of the summarized embodiments of the invention and/or additional embodiments of the invention may be found in the detailed description of the invention below.

BRIEF SUMMARY OF THE INVENTION

The aforementioned temporary or stationary marker projection systems is suited for use under controllable or static (substantially unvarying) ambient lighting conditions. However, the inventor herein has observed that an unmet need exists for systems which are capable of projecting a temporary or permanent marker bright enough and/or wide enough to be seen from different perspectives and, optionally, from considerable distances for safety concerns. With detection, reporting and controls within these systems and Augmented reality method to see the yellow graphic line to gain like if you watched it on the TV.

The inventor herein has also observed a need for systems capable of projecting a line segment, boundary line, spot, or other marking which, though intense enough to be seen from a wide range of viewing angles, and conforms to all applicable eye-safety regulations such as those promulgated by the FDA's Center for Diagnostic and Radiological Health (CDRH) and ANSI state and federal rules and regulations. AR device to actually see the virtual yellow line broadcast on TV.

It is yet another object of this invention to provide such a device with associated method of use that is inexpensive to manufacture and maintain while retaining its effectiveness.

Further objects of the invention will be brought out in the following part of the specification, wherein detailed description is for the purpose of fully disclosing the invention without placing limitations thereon.

These and other embodiments which characterize the invention are pointed out with particularity in the claims annexed hereto and forming a part hereof. However, for a better understanding of the invention, its advantages and objectives obtained by its use, reference can be made to the drawings which form a further part hereof and the accompanying descriptive matter, in which there are illustrated and described various embodiments of the invention.

BRIEF DESCRIPTION OF THE SEVERAL VIEWS OF THE DRAWING

With the above and other related objects in view, the invention exists in the details of construction and combination of parts as will be more fully understood from the following description, when read in conjunction with the accompanying drawings in which:

FIGS. 23 and 24 are just some examples of my methods of tracking the football, the players, goal line, flag sets, goal posts and the ground on and around the playing field with antennas placed in the ground under the field to booster the signal location for real-time tracking locations. Cameras, GPS, Sonic, Paint, Ink, Radium, RFID and or LoRa WAN Accelerometers as examples. But not limited to these embodiment's.

DETAILED DESCRIPTION OF THE INVENTION

Figure 1:
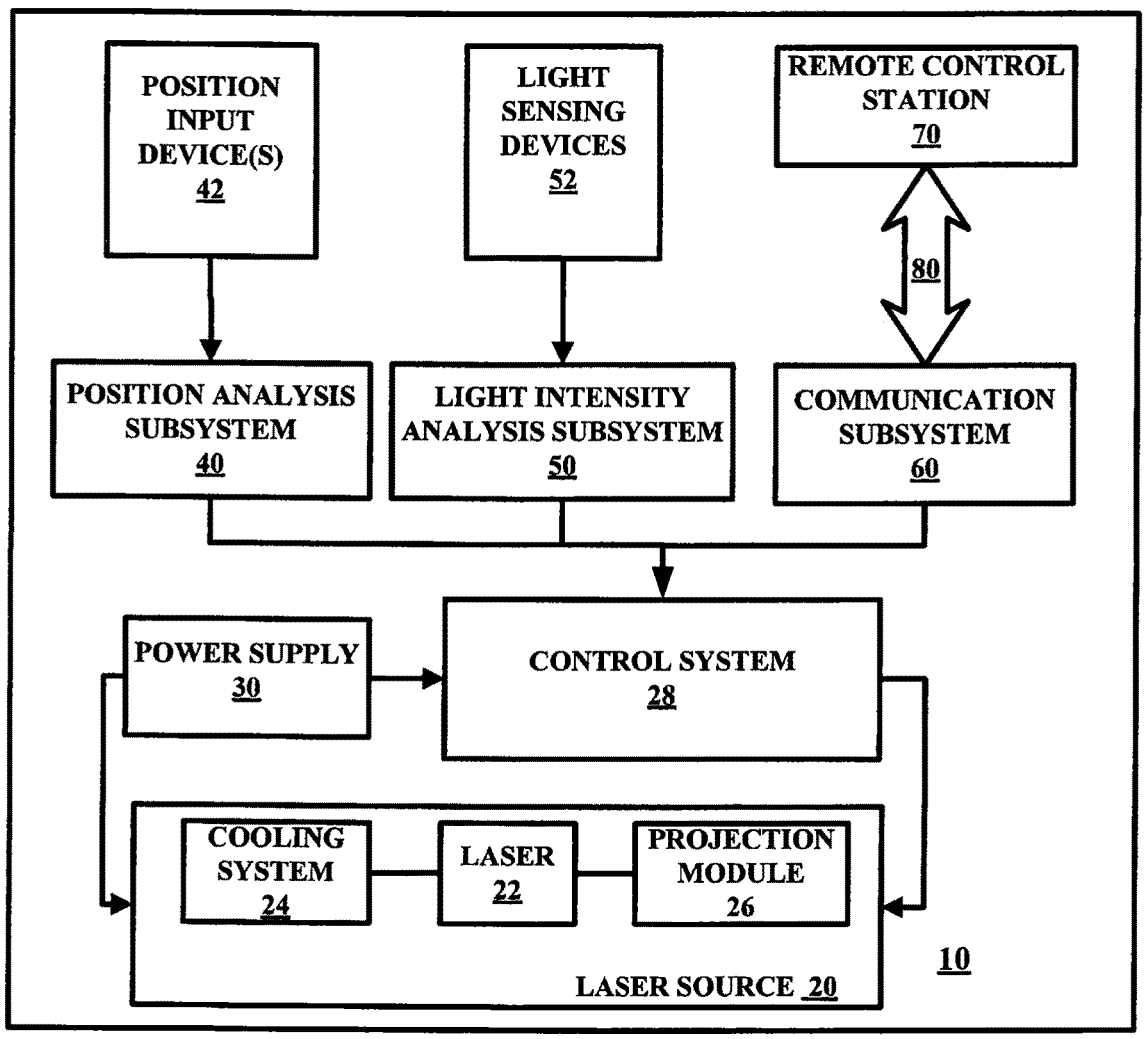
FIG. 1 is a block diagram depicting the various functional elements of an exemplary temporary marker projecting system according to an embodiment of the invention.

While this invention may be embodied in many different forms, there are described in detail herein specific embodiments of the invention. This description is exemplary of the principles of the invention and is not intended to limit the invention to the particular embodiments illustrated and described.

For the purpose of this disclosure, like reference numerals in the figures shall refer to like features unless otherwise indicated or is obvious by context.

The subject device and method of use is sometimes referred to as the method, the process, the invention, the sports measuring method, the laser line method, the machine or other similar terms. These terms may be used interchangeably as context requires and from use the intent becomes apparent. The masculine can sometimes refer to the feminine and neuter and vice versa. The plural may include the singular and singular the plural as appropriate from a fair and reasonable interpretation in the situation.

Embodiments consistent with the present disclosure are directed to systems which are capable of projecting and/or utilizing one or more markers that remain visible under ambient lighting conditions which may vary substantially over an applicable interval of time. Such lighting conditions may be encountered, for example, at an outdoor athletic or sporting event, a construction or mining worksite, or at locations where traffic (e.g. vehicular or aviation) is being directed or guided to maintain public safety.

In some embodiments, a laser projecting apparatus is selectively movable along the side of, and/or above, a target surface and is dimensioned and arranged to project at least one temporary, visible reference line upon the target surface. The target surface may include a portion of an athletic field, a race track, the ground and/or road surface of an activity site (e.g., a construction or mining site), a road or airfield traffic control area, or a manufacturing or warehouse facility whose efficiency would be enhanced by the availability of one or more reference marking(s) to guide workers to and from inventory location and/or to delineate other boundaries or locations in the course of a workflow process.

In an embodiment, a system consistent with the present disclosure comprises a movable structure that is dimensioned and arranged to be supported by and project upwardly from an underlying surface. The system further includes a laser source supported by the movable structure, the laser source being maintained by the movable structure at an elevated location relative to a target surface. This allows the laser source to direct optical energy downward upon the target surface while the movable structure is maintained substantially in a first orientation relative to the underlying surface. A safety system includes a position sensing arrangement operative to determine when one or more persons is too close to the system itself or to the optical energy output by the system. Systems consistent with the present disclosure may further include one or more proximity sensors and an image capture device and image analysis system adapted to monitor the relative position of moving objects on a surface relative to the output of the system. The laser source may consist of a laser, power source, and associated optical output shaping elements as, for example a laser projector unit, with at least the projector unit being supported by and movable as a unitary whole with the movable structure. In an embodiment, the output of the laser source is further responsive to an ambient light intensity measurement and analysis subsystem, the output of the laser source being either disabled or modulated in the interest of safety and power efficiency according, for example, to an empirically derived performance curve.

In some embodiments, an apparatus provides at least one visible marker (e.g., an arrangement of guiding lines or line segments) for the duration of a site activity period, wherein the projected visible is usable as a reference aid throughout the site activity period despite dynamically variable ambient lighting conditions. In an embodiment, a system includes at least one laser source operative to direct optical energy at a wavelength of between 380 nm and 750 nm upon a surface proximate a first site location and an ambient light sensor dimensioned and arranged to detect variations in an intensity of sunlight at the first site location so as to approximate an intensity of sunlight striking the surface. Each laser source includes one or more lasers operated a power level of 10 to 200 W each, and either in tandem such that their output is combined or in a prescribed sequence, so that less than all of a plurality of lasers (i.e., a subset) are operated at any given interval within the site activity period.

In some embodiments, a computer, which includes a processor and a memory, is operatively associated with the ambient light sensor, the processor being operative to execute instructions stored in memory to select, responsive to detected changes in ambient light intensity, any of a same, decreased and increased laser power output in order to continuously maintain visibility of a projected line for the duration of the site activity period. A laser controller is operatively associated with the at least one laser and, according to embodiments of the invention, is communicatively coupled to the computer. The laser source controller is operative to modulate an output of the at least one laser source responsive to commands from the computer to any of maintain, decrease or increase an output of the at least one laser source.

In an embodiment, a computer implemented method for continuously projecting a reference aid over the course of an activity period comprises receiving, at a computer-controlled laser projection system, a request to project at least one line extending from a first site location, over a site activity period, as a reference aid for use in at least one of approaching and departing the first site location. The method further comprises detecting variations in ambient light intensity during the site activity period, and operating at least one laser source of the laser projection system, responsive to the detecting, to project a lane which is visible continuously throughout the site activity period. In an embodiment, a site activity period is at least 24 hours and the operating is performed continuously over the site activity period and under ambient operating conditions ranging from full daylight to artificial light only. Disruption of operation occurs only if a manual override is actuated, or an unsafe condition such as a dangerous level of explosive vapor in the atmosphere or a level of vibration indicative of an explosion or other even disruptive to continued processing operations at the site location. While a system consistent with the present disclosure is in use, vehicles and equipment are operated by reference to the projected line to situate them at a desired location relative to a work site processing facility or other work site location.

In yet another embodiment, a system consistent with the present disclosure includes a camera and an image analysis algorithm stored in memory and executable by a processor of a computer to determine the information of a still or moving object (not limited to) then based on calculation's or typed in instructions sent to a laser line projecting apparatus, mounted to a guy wire delivery system, that is selectively movable along and above the center of a playing field, and or stadium, and dimensioned and arranged to project at least one fixed and or temporary, visible reference first down laser line or a touch down laser line onto a playing surface. A camera and or a learning programmed computer system or a switching remote controlled wireless device, constructed in accordance with the teachings of the present invention comprises a movable laser source and projector system on a guy wire structure that is dimensioned and arranged to be supported by and project onto a target on the field of play. The system can further include a remotely located larger laser source (not limited to) connected via fiber optic cable (or the actual larger laser source itself) to a mounted on a guy wire system moveable up and down the field which is supported by the movable structure, the laser source being maintained remotely (or mounted on the guy wire system itself) in another location and the laser line projector moves by the movable structure (or mounted in one or more different locations) at an elevated location relative to the target playing field surface. This allows the camera's view and laser projected source to direct optical energy (not limited to) directly downward upon the field or stadium while the movable structure (or still mounted) is maintained substantially in a first orientation relative to the target playing surface. The learning algorithm anticipates the movements of objects and things on the field in the stadium to determine the location of the projected first down or touch down laser line, (not limited to) to display a specific laser line across the field directly from overhead to show the players, officials, coaches, fans in the stands and on all the cameras different angles broadcasting the event where the usually invisible first down line really is.

In a further embodiment, a system adapted for use in associate with objects movable on a target surface in a cyclical fashion (e.g. football, players, flag sets, cars or runners racing in laps around a track) comprises a camera and algorithm determining the information of a still or moving object (not limited to) then based on calculation's sent to a laser projecting apparatus that is selectively movable along a field and or stadium and dimensioned and arranged to project at least one temporary, visible reference graphic onto a surface. A camera and learning programmed system constructed in accordance with the teachings of the present invention comprises a movable structure that is dimensioned and arranged to be supported by and project onto a target surface. The system further includes a laser projected source (not limited to) supported by the movable structure, the laser source being maintained by the movable structure (or mounted in one or more different locations) at an elevated location relative to the target surface. This allows the camera's view and laser projected source to direct optical energy (not limited to) downward upon the field or stadium while the movable structure (or still mounted) is maintained substantially in a first orientation relative to the target surface. The learning algorithm anticipates the movements of objects and things on the field in the stadium or on a track, to determine their location and amount of revolutions and or trips around the track in relation to the laser graphic, (not United to) to display a specific corresponding graphic (numbers, but not limited to) determined.

Another preferred embodiment (but not limited to) is a detection system to allow for the reporting of when the ball (with for example only ink, paint, RFID or like sensors inside) breaks the plane of the first down laser and or goal line. Detection systems for the ball carriers, receivers' knee (sensors at all players knees uniforms cup) location at the time of breaking the plane of the first down line and or goal line, or for a fair catch, ball hitting the ground before player catches it. Goal line detection for kickers ball to report if the ball clears the up rights. (but not limited to these combination detections and reporting systems and methods).

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF EMBODIMENTS OF THE INVENTION

The present invention now is described more fully hereinafter with reference to the accompanying drawings, in which embodiments of the invention are shown. This combination invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "laser source" is intended to refer both to arrangements in which a coherent laser beam source and beam projecting optics are integrated into a single housing at a common mounting location and to arrangements in which the laser source itself consists of optical beam collimating, diffusing and/or scanning elements configured to receive, via a waveguide (e.g., optical fiber), the output of a remotely located laser source. The term "laser sources" should also be understood to encompass other line forming arrangements besides those which rely upon beam diffusing elements such as lenses, including for example, the movement of mirrors to implement a "scanning" operation.

It should also be understood that although the exemplary embodiments illustrated and described herein relate specifically to the projection of a visible straight line onto the grass surface of a football field, the teachings of the present invention are equally applicable to the projection of other types of lines—including images, logos, advertising messages, and the like—onto any surface covered by real or artificial turf.

With initial reference to FIG. 1, there is shown a block schematic diagram depicting a temporary marker projecting system 10 in accordance with an illustrative embodiment of the invention. System 10 includes a laser source indicated generally at 20, which includes a laser 22 and a cooling system 24 for maintaining the laser within a temperature range suitable for safe operation. Laser source 20 further includes projection module 26 adapted to receive the optical energy from laser 22 and, responsive to control signals received from control system 28, direct the optical energy onto an athletic field or other surface (not shown). Power for laser source 20 and control system 28 is provided by a power source indicated generally at 30.

In accordance with an illustrative embodiment of the invention which will be described later, laser 22, cooling system 24, and projection module 26 are all supported by a transportable platform structure for collective positioning in proximity to the surface upon which one or more visible markers are to be temporarily projected. In accordance with an alternate embodiment which will also be described later, projection module 26 is mounted on a telescoping structure which is extensible between an in-ground retracted position and an extended, above ground position. In both of the illustrative embodiments, power and optical energy output by laser 22 are generated remotely relative to projector module 26 such that these are supplied via an electrical cable and an optical fiber, respectively. It should be emphasized, however, that the aspects of the present invention relating to safe operation and adaptability to dynamically varying ambient lighting conditions are equally applicable to alternative configurations and that the particular projecting platforms described herein are for exemplary purposes only.

With continuing reference to FIG. 1, it will be seen that system 10 further includes a position analysis subsystem 40, a light intensity analysis subsystem 50, and a communication subsystem 60. Each of the aforementioned subsystems is communicatively coupled to control system 28 which, in turn, is configured to disable the output of laser source 20 or to vary that output responsively to input from those subsystems. Control system 28 is responsive to input from position analysis subsystem 40, for example, to immediately disable the output of laser source 20 when one or more persons gets too close to system 10 itself or to the optical energy output by system 10. Likewise, control system 28 is responsive to input from light intensity analysis subsystem 50 to immediately disable the output of laser source 20 when a reduction in the intensity of ambient light is so rapid as to cause the pupil of the average human eye to dilate sufficiently to expose that eye to levels of visible laser radiation in excess of the accessible emission limits contained in Table II of 21 CFR Subchapter J Part 1040.10 (i.e., above the threshold for Class IIIa mode of operation under rules promulgated by the U.S. Center for Devices and Radiological Health.

In accordance with an especially preferred embodiment of the present invention, control system 28 is further responsive to input from light intensity analysis subsystem 50 to dynamically vary the output of laser source 20 in response to changes in the intensity of ambient light which are noticeable to the human observer. For example, on a partly cloudy day, it is possible for ambient lighting conditions to vary considerably from one moment to the next. During periods when the level of ambient light is at its peak, say above a level of hi noon sun light, it is necessary to safely operate the laser source (in multiple different angled projectors to decrease the possible exposure at any one given projection point but to give the overall line full brightness and power) at its highest power rating (e.g., 200-300 W). Conversely, as a cloud is passing over, the unnecessarily high brightness of a temporary marker projected by system 10 may become a distraction to observers and event competitors alike. Reductions in the output power of laser source 20 are not only warranted during such periods, but they also serve the interests of maintaining Class IIIa operation as noted above and also power conservation.

Data for operation of position analysis subsystem 40 of system 10 is collected from position input devices indicated generally at reference numeral 42, while data for operation of light intensity analysis subsystem 50 of system 10 is collected from light intensity input devices indicated generally at 52.

Finally, control system 28 is further responsive to instructions manually programmed or input by a remote operator. Such instructions originate at a remote-control station indicated generally at 70 and be transmitted, for example, over a conventional communication link indicated generally at 80. In some embodiments, communication link 80 may utilize a communication medium such as an electrical wire or optical fiber and, in others, an over-the-air link may be used. It suffices to say that using such a medium, a remote operator has complete control over the operation of system 10, including the ability to energize and de-energize laser source 20, to set appropriate thresholds of proximity and light intensity levels for subsystems 40 and 50, respectively, and to select the locations and dimensions of the temporary markers to be projected by system 10.

Figure 2:
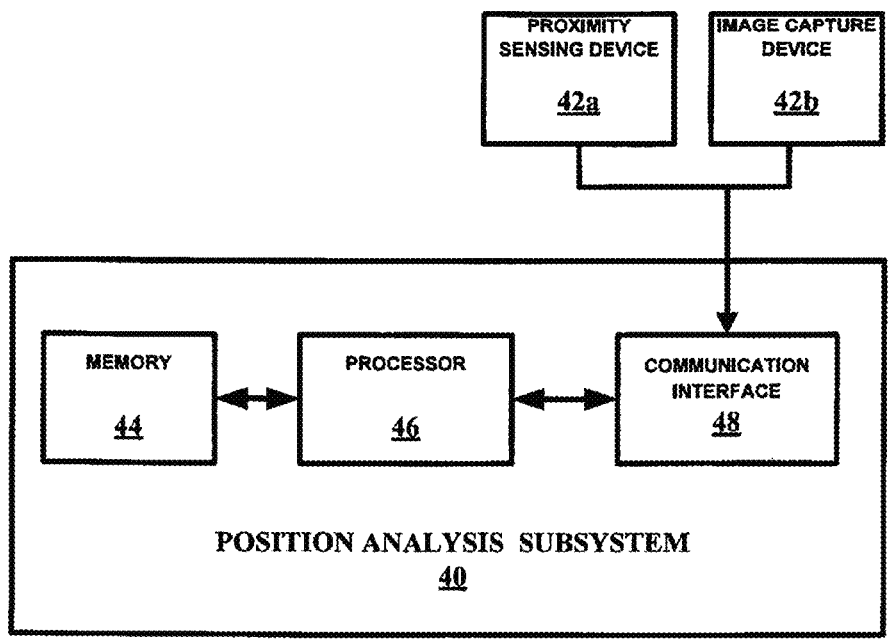
FIG. 2 is a block diagram depicting the various functional components of the position analysis subsystem utilized in the construction of the illustrative temporary marker projecting system of FIG. 1.

With reference now to FIG. 2, a position analysis subsystem 40 according to the illustrative embodiment of FIG. 1 will now be described in greater detail. As seen in FIG. 1, position analysis subsystem 40 comprises a memory indicated generally at reference numeral 44 and containing instructions executable by processor 46 for performing the position analysis functions of subsystem 44. The output of one or more conventional proximity sensors indicated generally at 42a are provided as input for analysis by processor 46 via communication interface 48. These sensors may be simple motion sensors, infrared (body heat) sensors or some combination of these, and it suffices to say that based on a threshold output value representative of the potential safety hazard to a person coming too close to system 10 during operation thereof, processor 46 determines that control system 28 should terminate the output of laser source 20 as described above.

With continuing reference to FIG. 2, it will be seen that position analysis subsystem 40 may be further configured to gather more detailed data about the movements of persons who, in the absence of suitable precaution, might be injured by the output of laser source 20 (FIG. 1). Specifically, positional analysis subsystem is further programmed with instructions for performing image analysis on the input received from one or more image capture devices (i.e., cameras) indicated generally at reference numeral 42b. An example of a system and algorithm which employs cameras and image analysis executed by a processor such as processor 46 to determine the relative position of moving objects in three dimensional space, which may be readily adapted for systems and methods according to the present invention, is described in published Canadian Patent Application CA2443178 entitled "A MOTION AND POSITION MEASURING DEVICE" and filed on Sep. 23, 2003 by Zhu Li, the disclosure of which is expressly incorporated herein in its entirety.

Through suitable programming, processor 46 executes instructions in accordance with thresholds set by the system operator such that when a person (or human-sized moving object) approaches the surface where a temporary marker is being projected or the path taken by the optical energy used to generate that marker, instructions are transmitted to control system 30 which, in turn, disables laser source 10.

Figure 3:
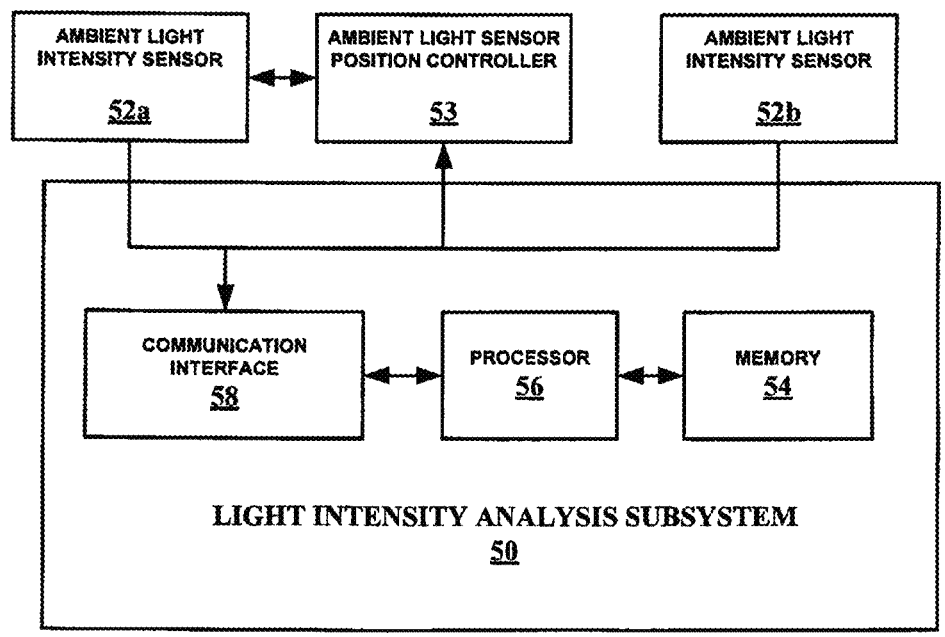
FIG. 3 is a block diagram depicting the various functional components of the light intensity analysis subsystem utilized in the construction of the illustrative temporary marker projecting system of FIG. 1.

With reference now to FIG. 3, it will be seen that light intensity analysis subsystem 50 of system 10 incorporates many of the same functional building blocks as position analysis subsystem 40. Indeed, at this point, it should be emphasized that the respective subsystems may be implemented either as special purposes devices with their own respective memory, processing and communication interfaces as memory 54, processor 56 and communication interface 58 of FIG. 3, or to make use of a common processor, memory and set of communication interfaces as may, for example, be implemented in the realization of control system 28.

In any event, and with continued reference to FIG. 3, it will be seen that light intensity information is gathered by one or more ambient light intensity sensors indicated generally at reference numeral 52a and 52b. Light intensity sensors as sensor 52a may be dimensioned and arranged to remotely measure ambient light intensity at locations adjacent to the precise region(s) of the surface upon which temporary markers are to be projected by system 10. Light intensity sensors as sensor 52b, on the alternative, may be disposed at respectively discrete, fixed locations individually or collectively representing a reasonable approximation of the ambient light intensity where corresponding temporary markers are to be projected. In a conventional manner, the outputs of intensity measurement sensors 52a and 52b are received as input by processor 46.

Processor 46 may receive additional input from other devices associated with the intensity measurement sensors, such as one or more position controllers respectively associated with a corresponding one of the intensity measurement sensors. A single position controller, indicated generally at reference numeral 53, is shown in operative communication with intensity sensor 52a. Where intensity measurements are taken remotely from locations which are subject to change during an event, it may be necessary to aim an applicable light intensity sensor as sensor 52a at a new location. In the illustrative embodiment of FIG. 3, position controller 53 executes the necessary instructions for moving the light intensity sensor 52a, as necessary, to keep a target measurement collection region, proximate to a projected marker, in proper view.

In embodiments where a single processor is not utilized to perform intensity measurement and analysis and laser source control, processor 46 is communicatively coupled to control system 28. If one or more conditions are met, a processor of control system 28 executes instructions for modulating the output of laser source 20. As mentioned earlier, control system may attenuate the output of laser source 20 so as to produce a lower intensity output, it may increase the output of laser 22 to increase the intensity, or it may disable it altogether. By way of illustration, operation of control system 28 and thus, laser source 20, may be governed by a laser source output power curve derived empirically for the venue, including the viewing angles of spectators, event participants, cameras, and prevailing extremes of ambient light intensity for a given geographic location (e.g., Las Vegas, Nev. vs. Seattle, Wash.). Although the development and implementation of one or more such output power curves admits of substantial variation, these tasks are believed to be well within the level of skill of the ordinary artisan and further discussion of such variations is omitted herein for purposes of clarity.

Returning briefly to FIG. 1, communication subsystem 60 is configured to communicate not only with a remote-control station via a communication link as noted previously, but also with each of the other subsystems as communication interface 48 of position analysis subsystem 40 and communication interface 58 of light intensity analysis subsystem 50. Of course, where a common processor, memory, and communication interface is used to implement the various functions performed by subsystems 40 and 50 and control system 28 in the above-described embodiment, communication subsystem would interact directly with input devices 42a, 52a and 52b, as well as position controller 53.

The projector module 26 itself may utilize a scanning projector and control arrangement of the type disclosed in U.S. Pat. No. 7,219,438 entitled SYSTEM FOR OPERATING ONE OR MORE SUSPENDED LASER PROJECTORS TO PROJECT A TEMPORARY VISIBLE IMAGE ONTO A SURFACE. Closed-loop galvanic scanners (also called "position detecting" scanners), for example, are commonly used in the laser light entertainment industry and are capable of directing a beam to 24,000 to 30,000 discrete points along a selected path every second.

The manner in which the output of laser source 20 is terminated also admits of substantial variation. For example, the laser itself can be de-energized in response to an input received from any one of position sensing system 40, light detection system 50, and a remote-control source. Alternatively, projection module 26 may incorporate a conventional shutter mechanism (not shown) such, for example, as an acoustic optical modulator (AOM) for turning off the beam.

For a line width of approximately six inches (15 cm), excellent results have been achieved using a 10 W, frequency doubled, Q-switched Nd: YAG laser adapted to generate laser pulses at a wavelength of 532 nm. Emission at this wavelength is especially preferred since it is very close to the peak (555 nm) of the human eye's sensitivity. By comparison, in an argon ion laser operating in continuous wave (cw) mode, roughly half of the output is at 514 nm (58% as bright as the same beam at 555 nm), another 30% is at around 480 nm (18% as bright) and the remaining 20% is at around 440 nm (barely visible to the human eye). Thus, an argon laser would theoretically have to deliver up to three or four times as much power to match the visibility of the Nd: YAG laser.

Figure 4A:
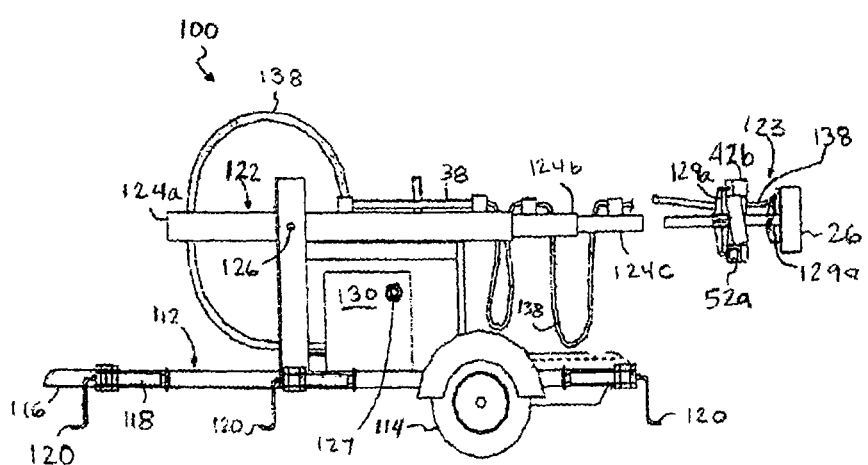
FIG. 4A is a side elevation view illustrating, in a stowed position, a portable embodiment of a temporary marker projecting system constructed in accordance with the teachings of the present invention.
Figure 4B:
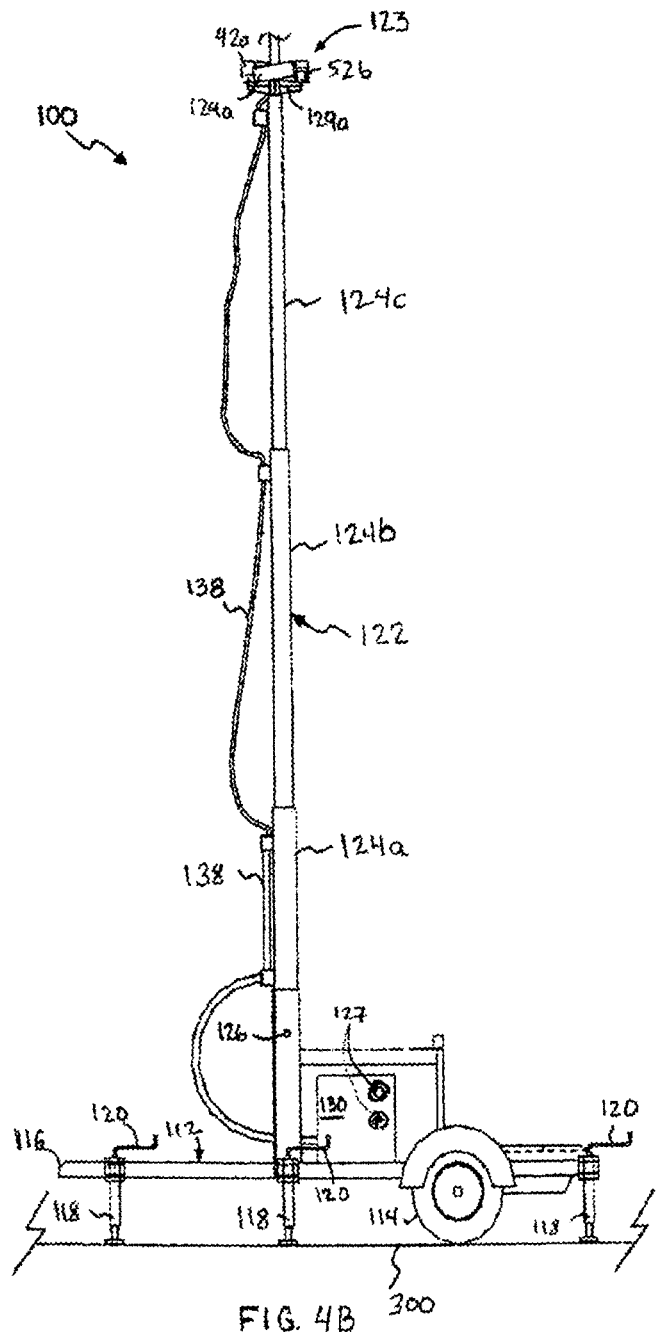
FIG. 4B is a side elevation view depicting the embodiment of FIG. 4A, deployed in a position of maximum extension for use in projecting one or more temporary markers in accordance with the teachings of the present invention.

Turning now to FIGS. 4A and 4B, there is a portable embodiment of a temporary marker projecting system 100 constructed in accordance with the teachings of the present invention, with FIG. 4A depicting a folded or "stored" configuration suitable for transport between events or venues and FIG. 4B depicting an extended position wherein projector 26 (FIG. 1) is elevated at a sufficiently high level above the ground surface as to project a visible, temporary marker or graphic display upon a surface where, for example, an event or contest being conducted.

With particular reference to FIG. 4A, it will be seen that system 100 includes a trailer 112 having at least two wheels 114, a tongue 116 for connection to a tow vehicle (not shown), and a plurality of pivotable outriggers 118 to stabilize trailer 112 when the trailer is deployed. Outriggers 118 may be manually pivotable from the generally horizontal stowed position shown to a generally vertical deployed position (FIG. 4B), and each may be retracted and extended to contact the ground by any conventional means, such as a handle 120.

A retractable telescopic mast 122 is mounted to trailer 112. Mast 122 comprises a plurality of extendable sections indicated generally at reference numerals 124a, 124b and 124c, and is pivotable upon a pivot point 126, allowing it to be stowed in a generally horizontal position for storage, movement or transport. A device mounting structure or platform 123 for supporting projection module 26 (FIG. 1) and, optionally, one or more position sensing devices as image capture device 42b (FIG. 2) and one or more ambient light sensing devices as light intensity sensing device 52b (FIG. 3), may be made detachable from mast 124 during transportation and/or storage of portable security system 100 to prevent damage to the respective input devices and projector module due, for example, to excessive shock or moisture intrusion from unusual device attitudes.

Respective one- or two-axis servo mounts 129a provides a remote operator with the ability to bring desired regions of an event surface into the view of a corresponding input device as devices 42b and 52a, and projector module 26. Common controls for image capture device 42b, such as pan, tilt, zooming and focus, may be remotely accessed and adjusted by means of communication link 80 (FIG. 1), as discussed above. The pan and tilt controls are equally applicable to adjustments in the position of projector module 26 and light intensity sensing device 52a, though a separately controlled X-Y scanning head (not shown) may be incorporated into projector module 26 where one or more temporary markers are to be generated using a scanning beam.

A lockable cabinet 130 houses the laser, laser power supply, and laser cooling system. Although an on-board generator can also be incorporated into the design of portable system 100, the illustrative embodiment of FIG. 4A contemplates a power plug receptacle 127 for powering system 100 from a separate source such as a remote generator or AC mains. Likewise, where the laser system is water cooled, cabinet 130 is configured with fluid inlet and outlet ports (not shown) for circulation of the coolant in a conventional manner. Cabinet 130 is preferably made of a sturdy material that is resistant to exposure to the environment and tampering, such as steel, composites and engineered plastics.

A separate cabinet (not shown) receives the afore-described communications, control, position sensing and ambient light sensing systems, and all of these may be powered either by rechargeable batteries or an external electrical source via an external environmentally protected power plug (not shown). The respective cabinets as cabinet 130 may be equipped with a series of locks to prevent theft and tampering. Locks may be used to secure mast 122 and any associated pivoting mechanisms such as a winch, outriggers 118, laser source cabinet 130, and a hitch portion of tongue 116. The locks may be configured such that a single key will unlock each lock. In one embodiment three keys are utilized with portable security system 100. A first key operates the locks. A second key provides access to cabinet 130. A third key is used to control a key-actuated electrical switch to activate portable temporary marker projecting system 100.

FIG. 4B depicts portable temporary marker projector system 100 in a deployed position. As can be seen, outriggers 118 are oriented generally vertically and are in an extended position, engaging the ground 300 to stabilize portable security system 100. Mast 122 is pivoted to a generally vertical orientation and one or more mast sections as sections 124a-124c are extended such that projector module 26 and input devices 42b and 52a are elevated for a clear field of view/projection. Various components of portable security system 100 may be adapted to discourage tampering by unauthorized personnel. For example, exposed cabling (optical and electrical) may be covered with rigid or flexible plastic or metal sheathing 138 (FIGS. 4A and 4B) to prevent disengagement or cutting of the cables. Access points, such as access panels, may be locked using conventional locking devices. Various hardware components may include conventional types of security screws, bolts and nuts, as well as conventional tamperproof fasteners.

Figure 5:
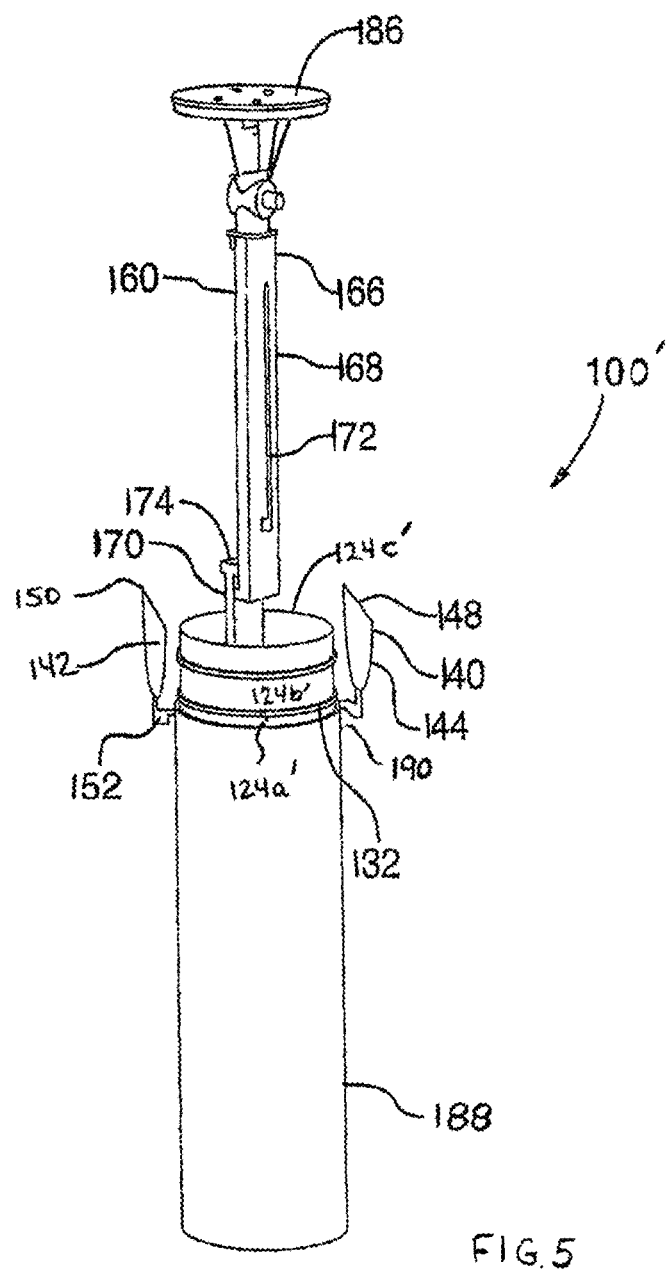
FIG. 5 is a partial side elevation view of a non-transportable embodiment of a temporary line projecting system, the system being dimensioned and arranged for telescoping extension from a retracted position underground to a deployed, above-ground position.

Turning now to FIG. 5, there is shown an in-ground retractable embodiment of a temporary marker projector system constructed in accordance with the teachings of the present invention. Retractable marker projection unit 100', like the transportable embodiment of FIGS. 4A and 4B, comprises a telescoping support 160 and a platform indicated generally at 186 for supporting the projector module and input devices previously described in connection with FIGS. 1-3. Platform 186 is mounted on a distal portion 166 of telescoping support 160.

In-ground retractable projection unit 100' further includes a housing 188 comprising a sleeve 190 having a lid 140 hinged to a distal portion of sleeve 190. The lid 140 is movable between a closed position (not shown) and an open position (as shown in FIG. 5). Housing 188 encloses telescoping support 160 and projector/device supporting platform 188 when telescoping support 160 is in the retracted position and when lid 140 is in the closed position. Materials used for constructing housing 188 for retractable projector unit 100' will depend on the environment in which the unit will be deployed. As the retractable projector unit 100' may be substantially installed in ground, housing 188 is preferably water resistant and/or dust resistant. Typically, housing 188 is constructed using a water and dust resistant plastic. To enhance dust resistance, weather resistant housing 188 may be in the form of a cylindrical sleeve 190.

Housing 188 comprises a plurality of telescoping sleeves as sleeves 124a', 124b' and 124c'. Sleeve 124c' nests within sleeve 124b' which, in turn, nests within sleeve 124a'. Sleeves 124b' and 124c' may be moved relative to sleeve 124a' between a retracted position wherein the former sleeves are nested within sleeve 124a' and an extended position wherein they are at least partially extended beyond sleeve 124a', thereby bring the projector module 26 (FIG. 1) and any input devices supported by platform 186 to a desired elevation above the surface of the ground.

With continued reference to FIG. 5, it will be seen that telescoping support 160 comprises a pair of arms 168, 170 capable of extending longitudinally relative to each other. Each arm 168, 170 defines a guide slot 172 along which the other arm 168, 170 is slidably movable. Each arm 168, 170 further comprise a stop 174 to prevent the detachment of the arms 168, 170 from one another.

An actuating system (not shown) is provided for moving telescoping support 160 upward relative to housing 188, between a retracted position, wherein telescoping support 160 is contained within the housing and an extended position, wherein a portion of the telescoping support 160 is extended outside of the housing 188. In alternate embodiments, an actuating may also be used for telescoping sleeves 124a'-124c' of housing 188 upward relative to sleeve housing 188, between a retracted position wherein the nested sleeves are contained within the housing and an extended position wherein a portion of at least one of the sleeves is extended outside of housing 188. By way of illustrative example, the actuating system may be configured as piston 80, such as a dual or triple stage piston capable of moving the telescoping support and sleeves independently. Alternatively, the actuating system may be a screw jack-based system comprising a screw, a motor assembly for rotating the screw, and a plurality of nuts, each mounted on an extendable portion of the telescoping support 160, wherein each nut departs the screw when the extendible portion on which it is mounted reaches a limit of extension.

At least one seal 132 is disposed around a distal end of sleeve 124a'. Seal 132 preferably has a downward tapered profile to facilitate the ejection of any foreign matter present on the housing. Upon elevation of the housing 188, any accumulated foreign matter such as dirt and dust will be transported down and away from the housing. Housing 188 further comprises a lid 140 hinged to a distal portion of sleeve 190. Lid 140 preferably comprises first 142 and second portions 144 with each of the portions being opposably hinged to a distal portion of housing 188 which extends above the ground level when the retractable projector unit 100' is in use. Preferably, self-clearing/non-jamming hinges 152 are employed to attach the lid 140 to the housing 188.

Lid 140 is movable between a closed position (not shown) and an open position (as shown in FIG. 5). The first portion 142 and second portion 144 of lid 140 are configured to move outwardly in opposing directions to actuate the lid 140 to the open position. Each of the first and second portions 142, 144 are sized to cover the opening of the housing 188 when the lid 140 is in the closed position. To that end, first and second portions 142, 144 of the lid 140 are sized and configured such that they lay substantially flat with opposing edges 148, 150 of the first and second portions 142, 144 abutting one another. Opening and closing of the lid 140 may be coordinated with the extension of the telescoping support 160 wherein extension of the telescoping support 160 causes each of the first and second portions 142, 144 to be displaced outwardly to either side of the housing 188. Retraction of the telescoping support 160 causes each of the first and second portions 142, 144 to return the closed position. Alternatively, the lid 140 may include an independent actuating system, such as for example, remotely controlled motorized hinges, for moving the lid 140 between the open and closed position.

Figure 6A:
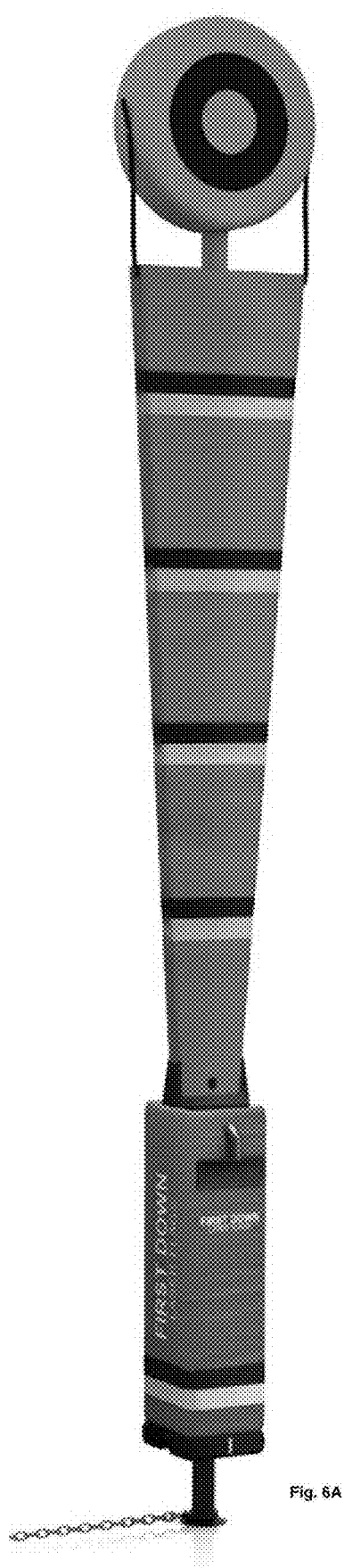
FIG. 6A is a perspective view of a portable embodiment of a temporary line projecting system for use in connection with the game of football.

It will, of course, be readily appreciated by those skilled in the art that a variety of other projection module mounting configurations are possible besides those exemplified by FIGS. 4A, 4B and 5. By way of illustrative example, there is shown in FIG. 6A an alternate configuration for use during a game of football. Laser projector module 26' is secured to a hand-graspable first pole 160' for selective placement, for example, by a member of a league's or athletic conference's officiating staff. In the same manner as conventional poles and chains are used today, first pole 160' is adapted for manual positioning and movement relative to a second pole (not shown) to which it is chained. In use, the second pole is placed along the initial line of scrimmage for a set of downs. A laser, power supply, cooling system and control system (none of which are shown) is preferably located in an underground vault at a convenient location within proximity to one of the sidelines. Ports (not shown) for detachable power, cooling and optical connection to laser projector 26' are disposed at a plurality of convenient locations along one or both of the lateral sidelines of the field. In use, first pole 160' is moved until the chain connecting it to the second pole is taught, and the laser projector module 26' is activated, subject to dynamic modulation or termination of the laser output according to the operation of a control system as previously described in connection with FIGS. 1-3.

Figure 6B:
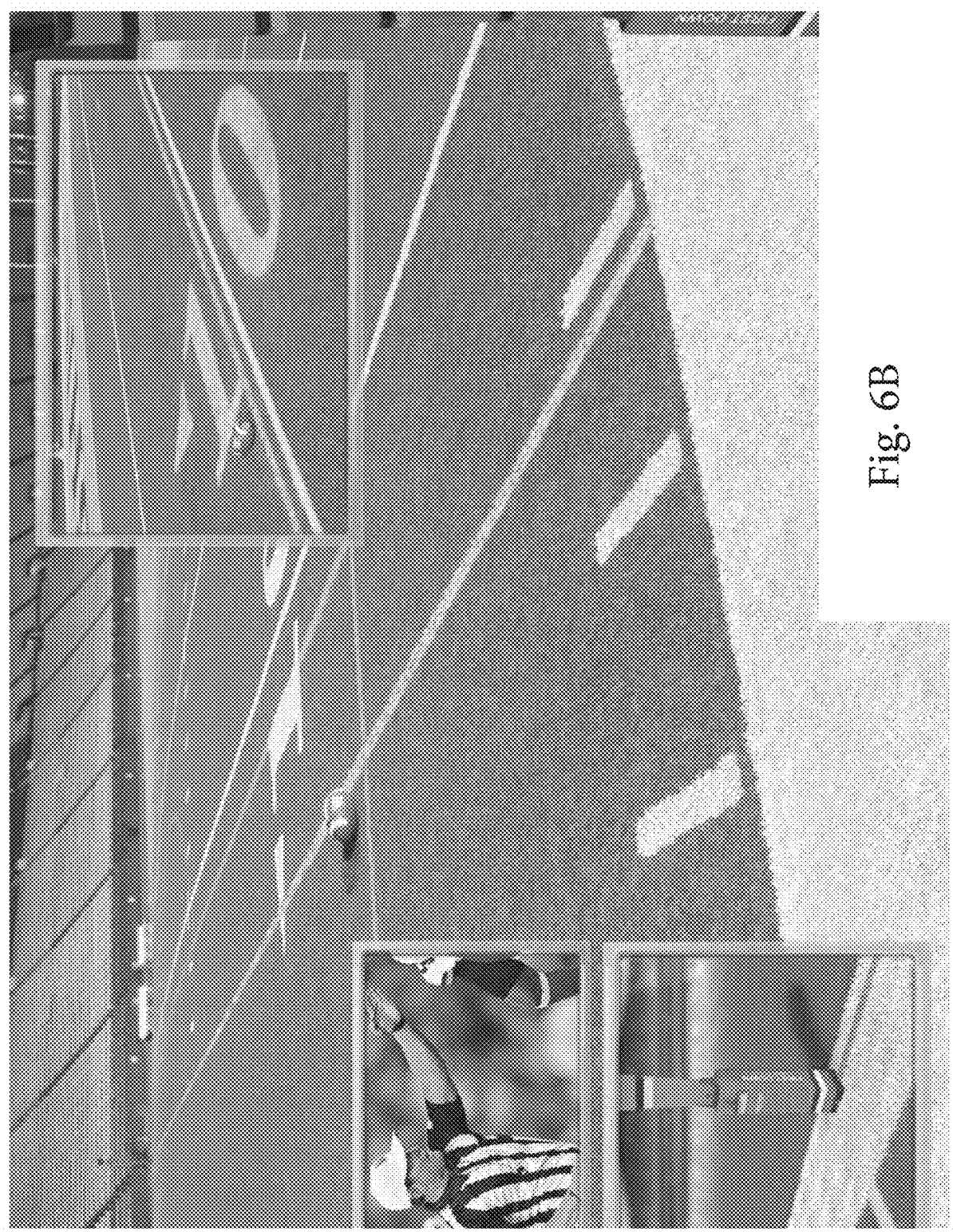
FIG. 6B depicts the projection of a single, static reference marker for use during the game of football by operating a system such as the one exemplified by FIGS. 1-3 and 6A.

In a modified configuration, second pole is omitted and pole 160' is maintained at a fixed "first down" position for a complete set of downs, and the system is continuously operated for that set of downs, again in accordance with the operation of a control system—including position analysis and light intensity analysis subsystems and corresponding input sensor elements dimensioned and arranged as necessary to provide the necessary control inputs—as exemplified by the embodiment depicted in FIGS. 1-3. In FIG. 6B, there is shown a temporary visible line L onto football field surface S.

In any event and with reference now to FIG. 6A, there is exemplified a series of temporary markings projected during an athletic event or contest utilizing a projection system such as the one of the exemplary systems depicted by FIGS. 1-6A. A variety of such applications are contemplated by the inventor herein. In the context of track and field events, a temporary marker projection system can be employed to generate static, dynamic markers or both. In the former case (which is depicted in FIG. 7A), the markers may correspond to one or more distance measurements statically measured from a fixed origination point. Examples of such measurements include a distance already achieved (or exceeded) by one or more athletes competing in an event, a distance achieved by a current leader in an event, a target distance set by an athlete's coach for training purposes, a distance corresponding to the achievement of a world record holder for the event, or any combination of these. Examples of events utilizing static measurements for which markers are temporary provided according to the present invention include, but are not limited to the shot put, discus or javelin throws, the long jump, and the standing broad jump.

It will be seen that a standing broad jump application of a temporary marker projection system includes a starting zone 600, a landing zone 602 and a temporary marker projecting system 610 which may comprise, for example, system 10 of FIG. 1, system 100 of FIGS. 4A and 4B, system 100' of FIG. 5, or optionally any other system capable of being operated to project one or more temporary visible markers as markers 604, 606 and 608 onto jumping area 602. In the illustrative example of FIG. 6A, marker 604 corresponds to an initial target set for an athlete by his or her coach for training purposes, marker 606 corresponds to a team record (e.g., collegiate or Olympic team) for the event, and marker 608 corresponds to a world record for the event. In the embodiment shown, system 610 includes an operator terminal for local entry of programming commands. Alternate configurations may include a mobile application executable by the processor of a smartphone or other mobile terminal device may be used to display a graphical user interface (not shown) for aligning the output of the laser source (not shown) of system 610 so as to project the markers at the desired location(s).

Dynamic markers are also contemplated as an application for temporary marker projection systems constructed in accordance with the teachings of the present invention. In this example, commands for system 610 are received over a wireless communication channel from a remote-control station 612. In front of, alongside, or behind an athlete (not shown) running on track 620, the position of a temporary marker 626 is continually updated, with respect to the starting time of a currently performing athlete, to show how that athlete's performance compares to at least one of the pace set by the athlete's own best prior performance, the athlete's target pace or pace needed to qualify in a given heat, of the pace set by a prior event participant, winner or record holder. Accordingly, as the position of the marker is continuously updated to move, for example, through points 626, 626' and 626", an event participant or trainee (and depending upon the output power of the laser used by system 10, any spectators as well), receives an accurate representation of a selectable pace.

With reference now to both FIGS. 1 and 7, a process for utilizing a temporary marker projecting system in accordance with the novel method of operation described in connection with. The process 700 is entered at block 702 wherein the projector module is moved and/or elevated to a location suitable for the projection of one or more temporary markers. At block 704, an operator selects between a mode of operation corresponding to fixed distance measurements and a mode of operation corresponding to rate (distance divided by time measurements). The process then proceeds to block 706, at which point the operator specifies the number and location of each measurement to be projected upon the field surface. At block 708, the instructions are transmitted over communication link 90 to control system 28, which energizes laser source 20 and causes the markers to be projected upon the field surface. At decision block 710, the position analysis subsystem continuously monitors the proximity of persons to system 10 and, if a person crosses a proximity threshold, or comes close to entering the path along which optical energy output by laser projector 26 is directed at the field surface, then the process proceeds to block 720 at which point the laser output is disabled for the duration of the incursion. At decision block 712, the light sensing subsystem monitors the ambient light intensity and, while the light level is within safe parameters for class IIIa operation, the output of laser source 20 continues in accordance with an empirically derived ambient intensity—laser output curve or at a predetermined level selected for the expected range of conditions. If, however, there is a sudden drop in the intensity of ambient light, the process proceeds to block 720 at which point the laser output is disabled for the duration of the intensity falloff. At decision block 714, if no interrupt command is received from the operator, operation of the laser continues as before and the process returns to block 710.

To maximize production output, certain work site activities may take place on a continuous (i.e. "round-the-clock") basis. Such is the case, in particular, in those activities driven by high capital investment, in which the equipment used is very specialized and acquired at high cost. At a mining site, for example, it is not uncommon for large dump trucks to shuttle back and forth between the same two stations many times over the course of a day, and for these trucks to be operated in shifts so that they are always in use (other than for refueling or maintenance). At one location, a load of ore may be dumped into the bed of the truck. At another, the load is dumped into a crushing pit. This circuit is repeated many times throughout the course of a 24-hour day, by each of a plurality of trucks, with the steady stream of ore being needed to feed a continuous processing operation which, if interrupted, results in lost productivity and in lost profits to the mine operator/owner. The inventor herein has observed that vehicles approaching a site of the type exemplified above are operated by highly skilled drivers. However, even for such drivers, it is a challenge to properly align the vehicle perfectly, the first time, every time. The risk of damaging adjacent structures or equipment is ever present. While guiding markers could theoretically be used, these are subject to damage and would restrict movement of vehicles and equipment in the vicinity of the discharge station or other facility being approached. Paint applied directly to the surface, on the other hand, would quickly deteriorate and/or be obscured by shifting sand, rocks or dirt.

Some embodiments consistent with the present disclosure provide a visible reference aid to guide vehicles and equipment at an activity site characterized, for example, by continuous operation and/or long operating cycles. Over a 24-hour operating cycle, for example, a system constructed according to embodiments consistent with the present disclosure may serve as a reference aid in conditions that include full daylight, twilight, and darkness.

According to some embodiments, at least one of the sensors is a commercially available ambient light intensity sensor, operating on the principles of devices used by photographers to detect lighting levels during photography sessions. The ambient light sensors are operative to detect variations in the amount of light at the site location over the course of an activity period. While an activity period may vary in duration, and may be interrupted for such reasons as scheduled maintenance, unanticipated equipment failure, or safety reasons, embodiments of the invention are operative to project a visible line for extended periods of time which may range from a few hours to a few days to a few weeks and even to months or years of uninterrupted operation. During night time (artificial light only) operation, a much smaller amount of laser output is required. In full daylight, on the other hand, the full output of several lasers may be required to generate a reference aid bright enough to be seen. Responsive to input provided by ambient light sensors located at each site location, the output of each laser projecting system as system 920 is adjusted so that a visible light is generated at all times. According to some embodiments, such dynamic adjustment comprises selecting one of a plurality of output levels according to whether the detected level of ambient light intensity falls within a range associated with the selected level.

According to some embodiments, projectors 922, 932 and 942 utilize one or more scanning projector and control arrangement of the type disclosed in U.S. Pat. No. 7,219,438 entitled SYSTEM FOR OPERATING ONE OR MORE SUSPENDED LASER PROJECTORS TO PROJECT A TEMPORARY VISIBLE IMAGE ONTO A SURFACE. Closed-loop galvanic scanners (also called "position detecting" scanners), for example, are commonly used in the laser light entertainment industry and are capable of directing a beam to 24,000 to 30,000 discrete points along a selected path every second.

Processor 912 executes instructions stored in memory leading to a comparison between a detected ambient light value and a series of reference ranges stored in datastore 918. According to some embodiments, each reference range represents that range of detected ambient light values at which one or more lasers operated individually or in combination produce a reference aid of sufficient visibility as to be useful to vehicle and equipment operators. According to other embodiments, a set of operating set points corresponding to a performance curve may be fixed by software, wherein this operating curve is used as the reference by which the output of each laser or each laser source is modulated with respect to time. As will be readily appreciated by those skilled in the art, the sensory input is not required during times of artificial lighting (i.e., after sundown and before sunrise) so dynamically variable operation according to a sensory input approach, as exemplified above, is preferably suspended during such times.

According to some embodiments, the processor 912 of control station computer 910 is responsive to input from light intensity sensors as sensor 124*a*, at Site Location A, to immediately disable the output of the associated laser projection system 920 when a reduction in the intensity of ambient light is so rapid as to cause the pupil of the average human eye to dilate sufficiently to expose that eye to levels of visible laser radiation in excess of the accessible emission limits contained in Table II of 21 CFR Subchapter J Part 1040.10 (i.e., above the threshold for Class IIIa mode of operation under rules promulgated by the U.S. Center for Devices and Radiological Health.

Other types of sensors which may be processed by processor 912 of station 910 include vibration sensors and vapor sensors 924*b* and 924*c*, respectively, associated with Site Location A. When a level of vibration indicative of an explosion is detected by sensor 924*b*, which is predictive of a disruption in operation, an unsafe operating condition, or a strong possibility of system component misalignment, control station computer 910 instructs the laser projection systems affected by the condition to shut off until the issue is resolved. Likewise, vapor sensor 924*c* is configured to characterize and determine the level of explosive vapors in the atmosphere surrounding a site location as Site Location A (FIG. 1). If this level is above the lower explosive limit (LEL) or below the upper explosive limit (UEL) and therefore indicative of an unsafe operating environment, control station computer 910 transmits a signal to corresponding laser projection system 920 and causes the system 920 to shut down until the issue is investigated and/or resolved.

It will be recalled that in the embodiment depicted in FIG. 1, a movable projector—allowing the projection of complex site location routing patterns to be defined—is contemplated. To define such patterns, instructions are stored in memory 914 and executable by processor 912 to allow the system operator to define the pattern associated with site location. User interface 915 and display 916 may be used for this purpose or, optionally, a mobile terminal such as a laptop, notebook or tablet computer operative to exchange communication signals with control station computer 910 via interface 919 can be used so that the pattern being defined can be viewed in real time while the operator is standing at the applicable site location being programmed.

Figure 8:
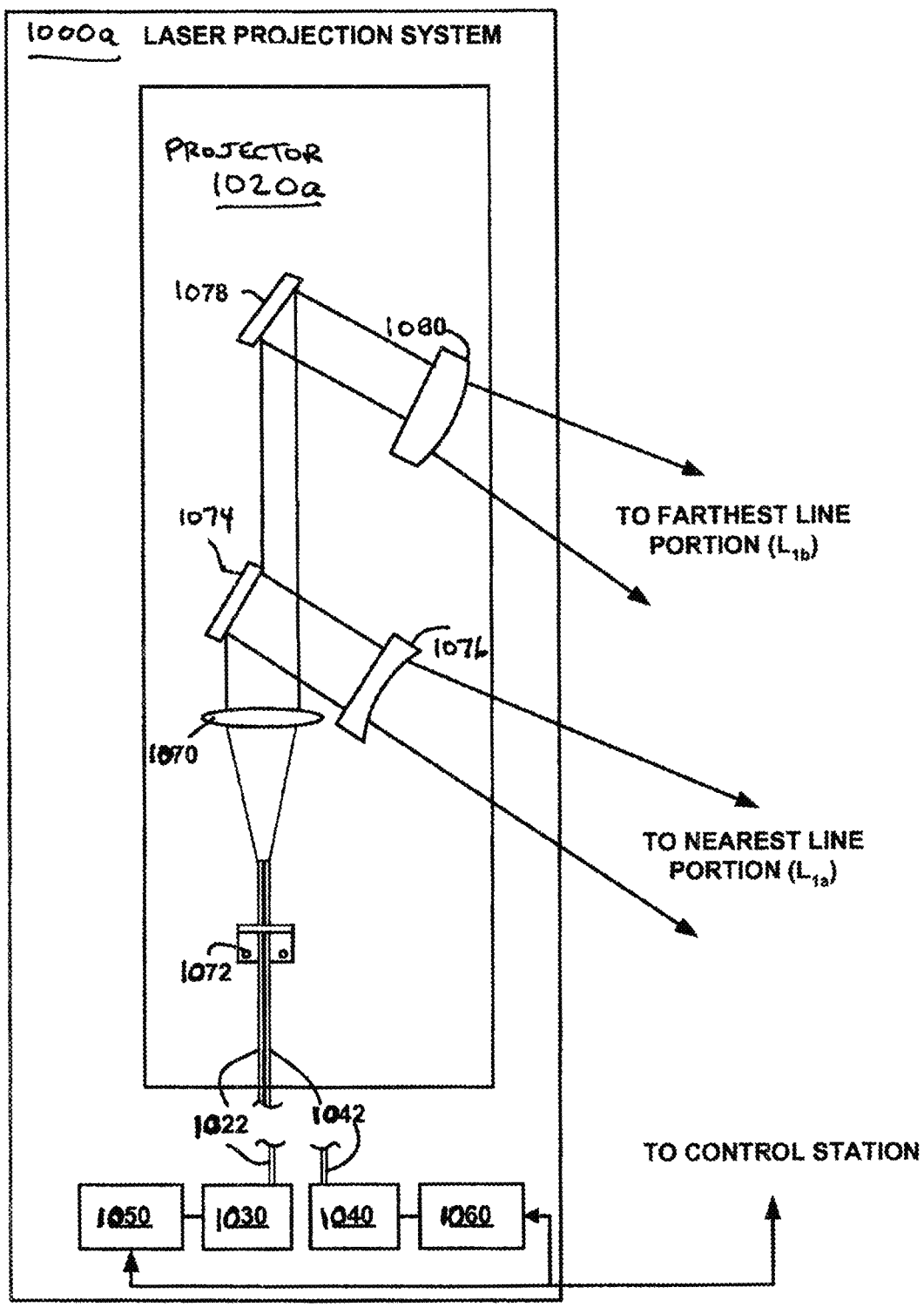
FIG. 8 is a block diagram depicting the construction of an exemplary laser projector as part of a laser projection system in accordance with embodiments.

With continued reference to FIG. 8, it will be seen that each laser projection system as system 920 can include one projector or multiple projectors as projectors 1 to m, a plurality of lasers as lasers $A_1$ to $A_n$, $B_1$ to $B_n$, and $C_1$ to $C_n$ and a power source for supplying power to all of these various components. According to some embodiments, one or more lasers and a projector constitute a single laser source. According to the embodiment of FIG. 8, any laser or group of lasers among lasers $A_1$ to $A_n$, $B_1$ to $B_n$, and $C_1$ to $C_n$ is operative to feed any one or all of projectors 1 to m.

Multiple projectors as shown in FIG. 8 are especially suited for complex reference aid shapes and lane patterns, particularly when bi-directional paths are to be defined in manner depicted in FIG. 1. For reference aids comprising only a single line, however, a single projector with stationary components (i.e., without moving parts) may be coupled to each of one or a plurality of lasers by corresponding optical fibers. An embodiment of the latter will now be described with particular reference to FIG. 8.

An exemplary projector useful, yet simple, reference aids according to embodiments is disclosed in FIG. 8. In this example, laser projection system 1000*a* includes a fiber fed projector 1020*a* which receives the output of two lasers 1030 and 1040 is via first and second optical fibers, indicated generally at reference numerals 1032 and 1042, respectively. Each laser is, in turn, operated by a corresponding laser controller 1050 and 1060, respectively. Each of laser controllers 1050 and 1060 are communicatively coupled to and under the operative control of projector control station 1010. It should be noted that although the functions of the control station 1010 and laser controllers 1050 and 1060 are described in connection with one embodiment as being separately performed by a distributed network of communicatively coupled modules, it should be readily appreciated by those skilled in the art that in other embodiments appropriate hardware can be incorporated into computer 1010 to perform any and all of the functions typically performed by a laser controller such, for example, as power on, power off, diagnostics, and power level modulation.

In any event, and with continued reference to FIG. 8, it will be seen that according to some embodiments, projector 1020a includes a biconcave, collimating lens 1070 which receives the output of lasers 1030 and 1040 via fibers 1032 and 1042. The fibers are maintained in a precise registration with collimating lens 1070 by a retaining block 1072 mounted within a projector housing. A portion of the collimated beam emitted by lens 1070 is reflected by a first or lower mirror 1074 into a plano-convex lens indicated generally at reference numeral 1076. The output of lens 1076 which projects optical energy onto the ground to define the nearest portion of line L1 indicated generally. The remaining portion of the output of the collimated beam output by lens 1070 is reflected by a second or upper mirror 1078 into a Plano-concave lens 1080 which projects optical energy onto the ground to define the farthest portion of the line L1 indicated generally at $L_{1b}$. Projector 1000b is constructed in like fashion.

It will, of course, be readily appreciated by those skilled in the art that a variety of other projection module mounting configurations are possible besides those exemplified by FIG. 8.

For a line width of approximately 6 inches, excellent results in full daylight ambient lighting conditions have been achieved using two lasers each operated at 50 W. Suitable lasers include frequency doubled, Q-switched Nd: YAG laser adapted to generate laser pulses at a wavelength of 532 nm. Emission at this wavelength is especially preferred since it is very close to the peak (555 nm) of the human eye's sensitivity. By comparison, in an argon ion laser operating in continuous wave (cw) mode, roughly half of the output is at 514 nm (58% as bright as the same beam at 555 nm), another 30% is at around 480 nm (18% as bright) and the remaining 20% is at around 440 nm (barely visible to the human eye). Thus, an argon laser would theoretically have to deliver up to three or four times as much power to match the visibility of the Nd: YAG laser.

With simultaneous reference now to FIG. 9, a process for utilizing a continuous reference aid projecting system in accordance with novel methods of operation will now be described. The process 1000 is entered at block 1102 wherein one or more projection systems constructed in accordance with embodiments of the invention have been installed at one or more activity site locations and these have been communicatively coupled to and are operative under the direction of a control station computer configured to receive input from one or more sensors located at one or more of the activity site locations. At block 1104, a request is received to continuously project at least one line at an activity site for the duration of an activity period. The period activity may be of finite duration (i.e. specified in the request) or of infinite duration (subject only to manual override by an operator or an interruption in operation due to power loss or the detection of an unsafe operating condition or other specifiable event).

At block 1106, the method energizes one or more laser sources are energized (as lasers $A_1$ to $A_n$ of FIG. 2 or lasers 1030 and 1040 of FIG. 8) and at block 1108. The process then proceeds to decision block 1110. If a substantial enough change in the level of ambient light is detected, such that a change in operation is required to maintain visibility and/or minimize power consumption (i.e. an ambient lighting measurement is received from a sensor which is brighter or dimmer than the preceding measurement interval), then at block 1112 the output of the applicable laser source(s) is/are modified. Otherwise, the method proceeds to decision block 1114. If an interruption event is detected, then at block 1116 operation is suspended for the duration of the interruption event. Otherwise, the process proceeds to decision block 1118. If no end point was specified in the request received at block 1104, the process returns to block 508. If an endpoint was specified, the process proceeds to decision block 1120. If the specified endpoint has been reached, the process terminates at block 1122. Otherwise, the process returns to block 1108.

Figure 9:
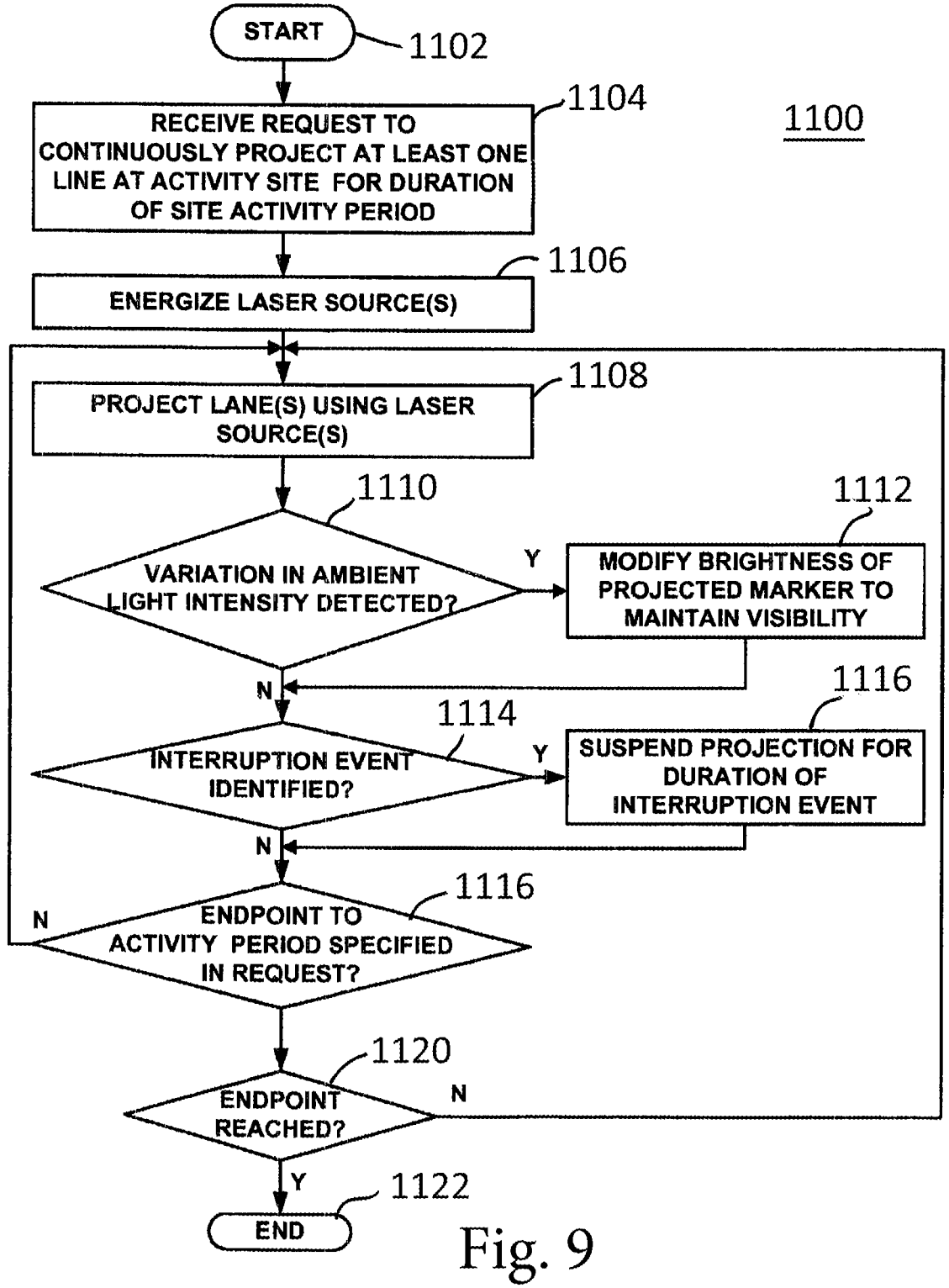
FIG. 9 is a flow chart depicting steps of operating embodiments of a laser projecting system to provide a continuous reference.
Figure 10:
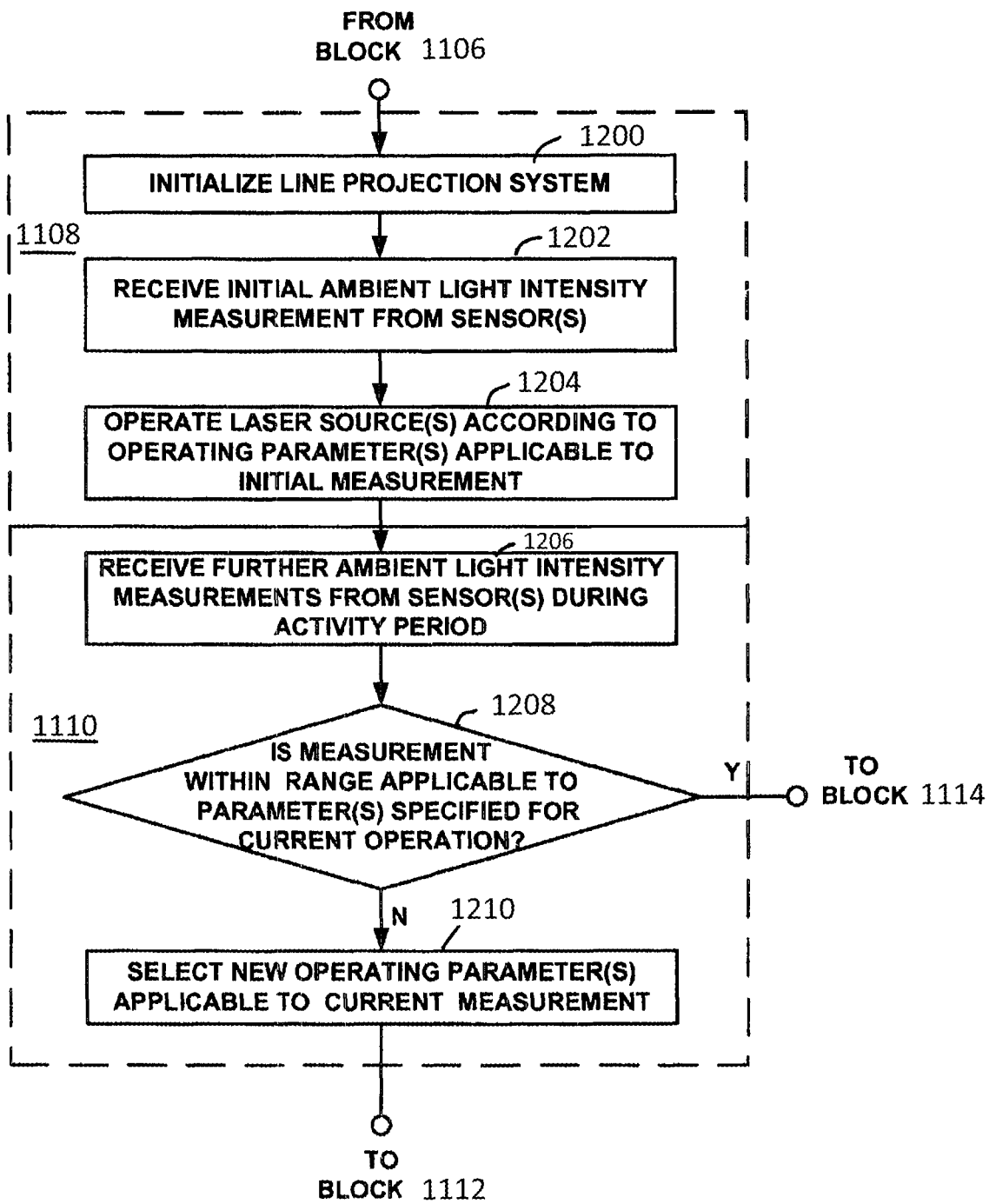
FIG. 10 is a flow chart depicting, in greater detail, a series of steps which may be performed as part of the exemplary process of FIG. 5 according to some embodiments.

Turning now to FIG. 10, an embodiment of the illustrative process of FIG. 9 is depicted in greater detail, with particular emphasis on blocks 1108 and 1110. According to embodiments, block 1108 encompasses, at block 1200, a step of initializing the line projection system. Typically, this includes performing a self diagnostic test to verify that all components essential to safe operation are in proper working order. Such components include the sensors, the signaling interfaces between control station computer 910 (FIG. 8) and the respective laser controllers, and the like. An operator of the control station computer may be prompted to confirm proper operation at this time.

The process of block 1108 proceeds to sub process block 1202, wherein an initial light intensity measurement is received and processed. According to some embodiments, a light intensity sensor may be present at each activity site location. Alternatively, a single light intensity sensor may be used. The measured value(s) is/are stored in the memory of the control station computer and, according to some embodiments, the computer processor selects an initial laser output power requirement based on the measurement(s). At 1204, one or more laser source(s) are operated according to the selected output power requirement.

In some embodiments, a respective, satisfactory power level is stored for a corresponding range of measured values. If the measurement(s) fall within one of these ranges, the applicable power level is selected for the laser(s) associated with at least the activity site location at which the sensor measurement was acquired. At sub-process block 1208 of block 1110, as new ambient light intensity measurements are acquired at sub-process block 1206, they are compared as described above to determine whether they are still within the range determined for the preceding interval. If so, the process returns to block 1114 (FIG. 9). If not, the processor of the control station computer selects, at sub-process block 1210, an updated power output level and sends a command or other signal to the applicable laser controller(s) to initiate laser operation at the selected, updated power output level. In embodiments, the aforementioned command is processed and operation at the modified brightness level begins.

Figure 11:
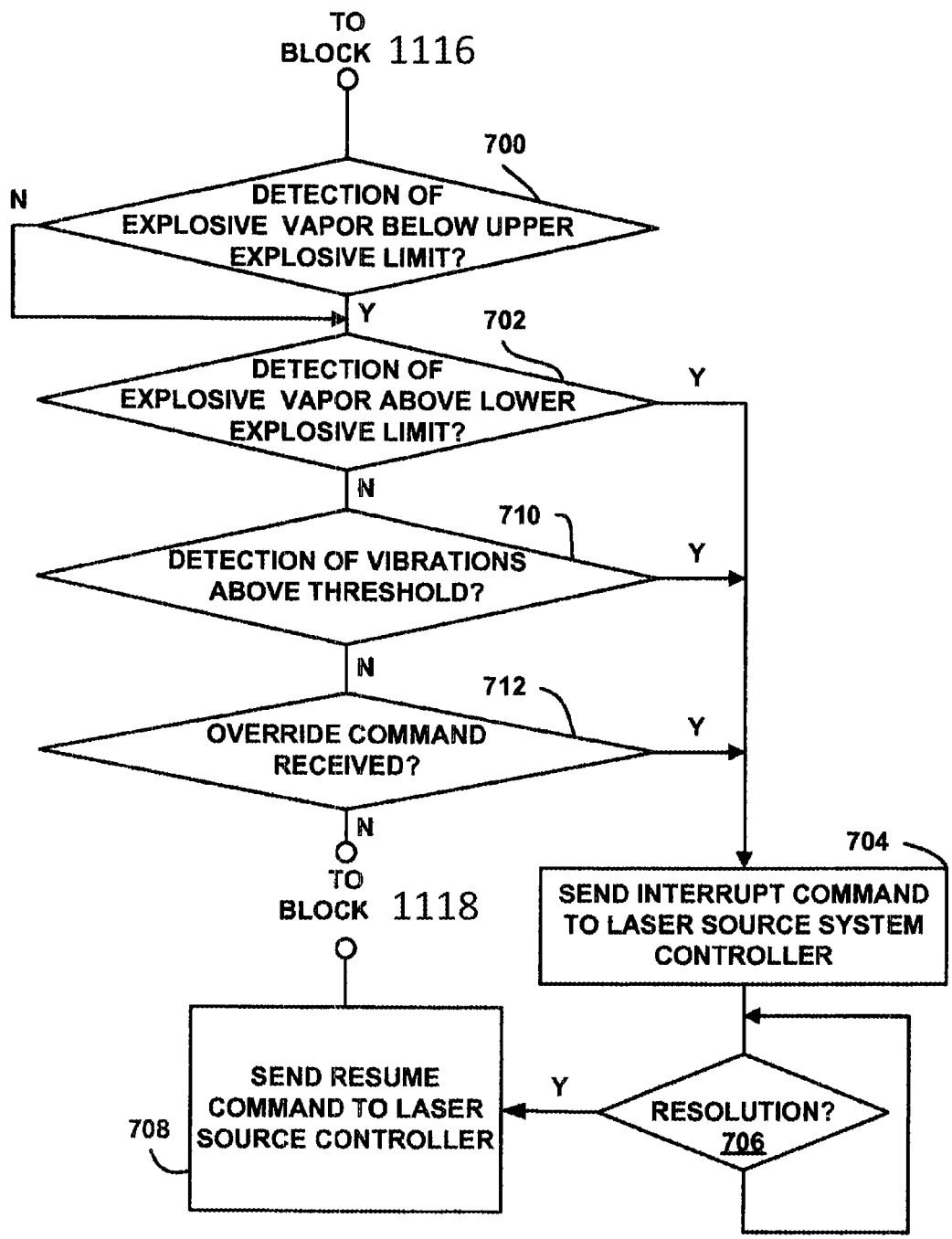
FIG. 11 is a flow chart depicting, in greater detail, a series of steps which may be performed as part of the exemplary process of FIG. 5 according to some embodiments.

With reference now to FIG. 11, there is shown a series of optional steps associated with the identification and handling of interruption events as a sub-process within block 1114 of FIG. 9 according to some of the embodiments of the invention. The sub-process begins at decision block 700, at which point a determination is made as to whether or not an explosive vapor is detected by one or more sensors to be at a level below the upper explosive limit. If so, a further determination is made at block 702 as to whether the explosive vapor is also present at a level above the lower explosive limit. Since operation in this range is highly dangerous, in the event the outcome of this determination is also yes, then the process proceeds to block 704. At block 704, an interrupt command is sent to the laser source controller(s) in the location of the sensor. Once the situation is resolved (at block 706), which may require confirmation by an operator or may be automatic based on an extended (say, for example 1 hour) period of readings below the lower explosive limit, a resume command is transmitted at block 708 to the laser source controller and operation resumes.

Returning to block 700, it should be noted that if a level of explosive vapor is detected which is above the upper explosive limit, this too may be processed by control station computer 910 or 1010 (FIG. 8) to suspend operation the lasers and associated controllers. In any event, assuming no or only permissible amounts of an explosive vapor in the atmosphere, the process proceeds from either of blocks 700 and 702 to decision block 710. At decision block 710, if a vibration sensor at an activity site detects the existence of vibrations indicative of an unsafe operating environment such, for example, as an explosion or other accident, then the event is processed by the processor of computer 910 or 1010 and all laser sources responsive to sending and processing of an interrupt event command at block 704 as above described. Likewise, at block 712, if an override command is received—whether by a local pushbutton operator at the location of the reference aid or by action of the control station computer operator—the interrupt event command is transmitted to the laser source(s) affected until the situation is resolved. If not interrupt events are detected or if the detected event(s) are resolved, then operation proceeds to block 1118 of FIG. 9.

Figure 12:
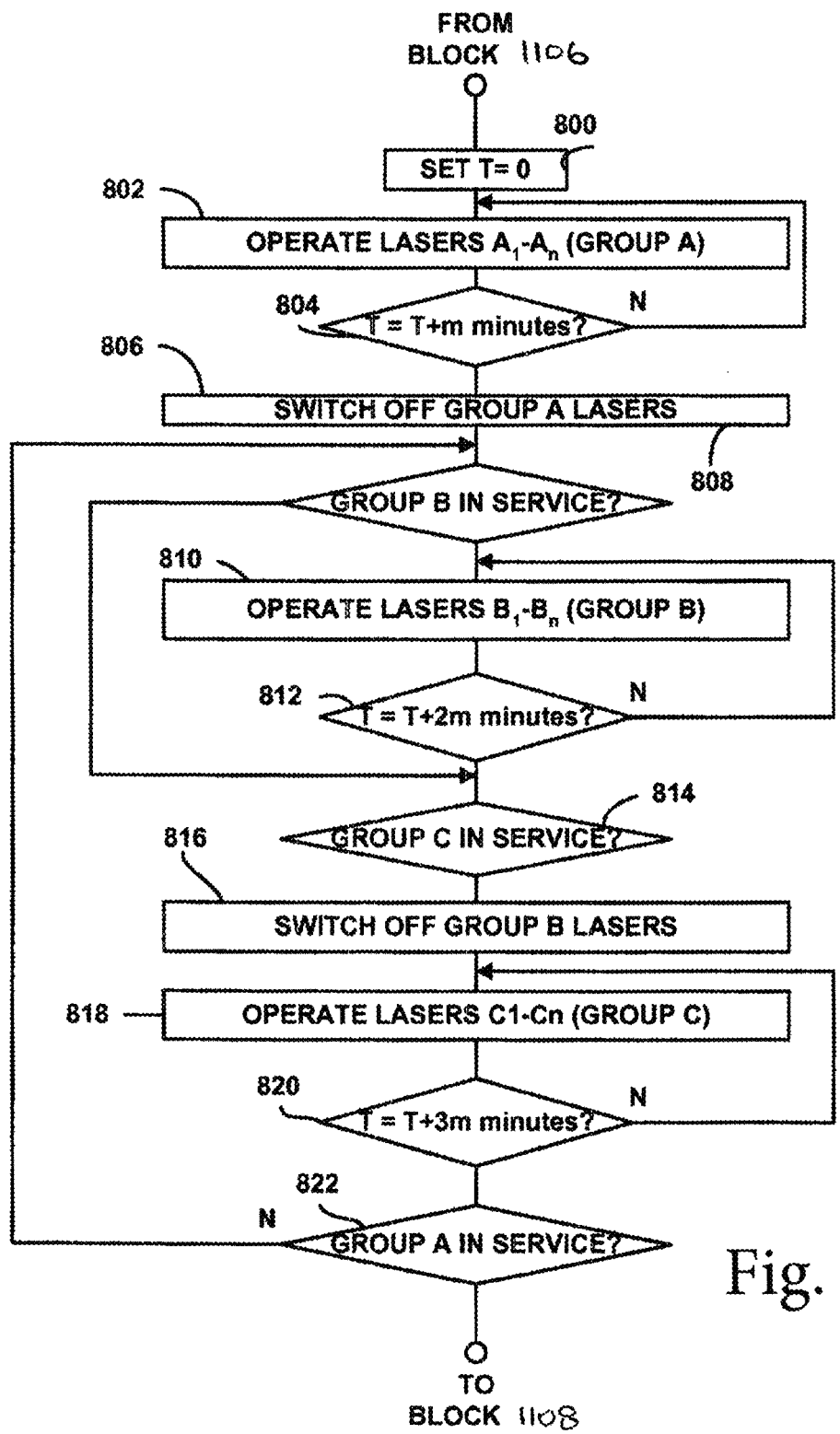
FIG. 12 is a flow chart depicting, in greater detail, supplemental steps which may be carried out as part of the illustrative process of FIG. 5 according to some embodiments.

With final reference now to FIG. 12, there is shown optional arrangement for operating subsets of lasers in round-robin fashion as part of a reference aid projecting system according to embodiments of the invention. As seen in FIG. 12, which proceeds from block 1106 of FIG. 9, an operating interval time T is initialized to zero at block 800 and at block 802, a first subset of lasers, as lasers $A_1$ to $A_n$ of FIG. 2, are operated during a time T+m minutes. M may be any number and may, in fact be measured hours or days rather than in minutes. The objective is to provide redundancy and ensure the projection of a visible reference aid over an extended period of time. According to some embodiments, m is a period of between 60 and 6000 minutes (i.e. 1 to 100 hours). At decision block 804, it is determined whether operation of the first subset of lasers has been for m minutes and, if so, these are switched off at block 806 and a determination is made at block 808 whether a second subset (Group B) are operational. If so, these are then operated at block 810 for another m minutes. If the lasers of Group B are not determined to be operational at decision block 808, or after determination at block 812 that operation of those lasers has proceeded for m minutes, the process proceeds to block 814, at which point a determination is made as to whether the lasers of Group C are operational. If so, the lasers of group B are switched off at block 816, and operation of the lasers of Group C proceeds at block 818 until, at block 820, it is determined that these lasers have been operated for m minutes.

Figure 7:
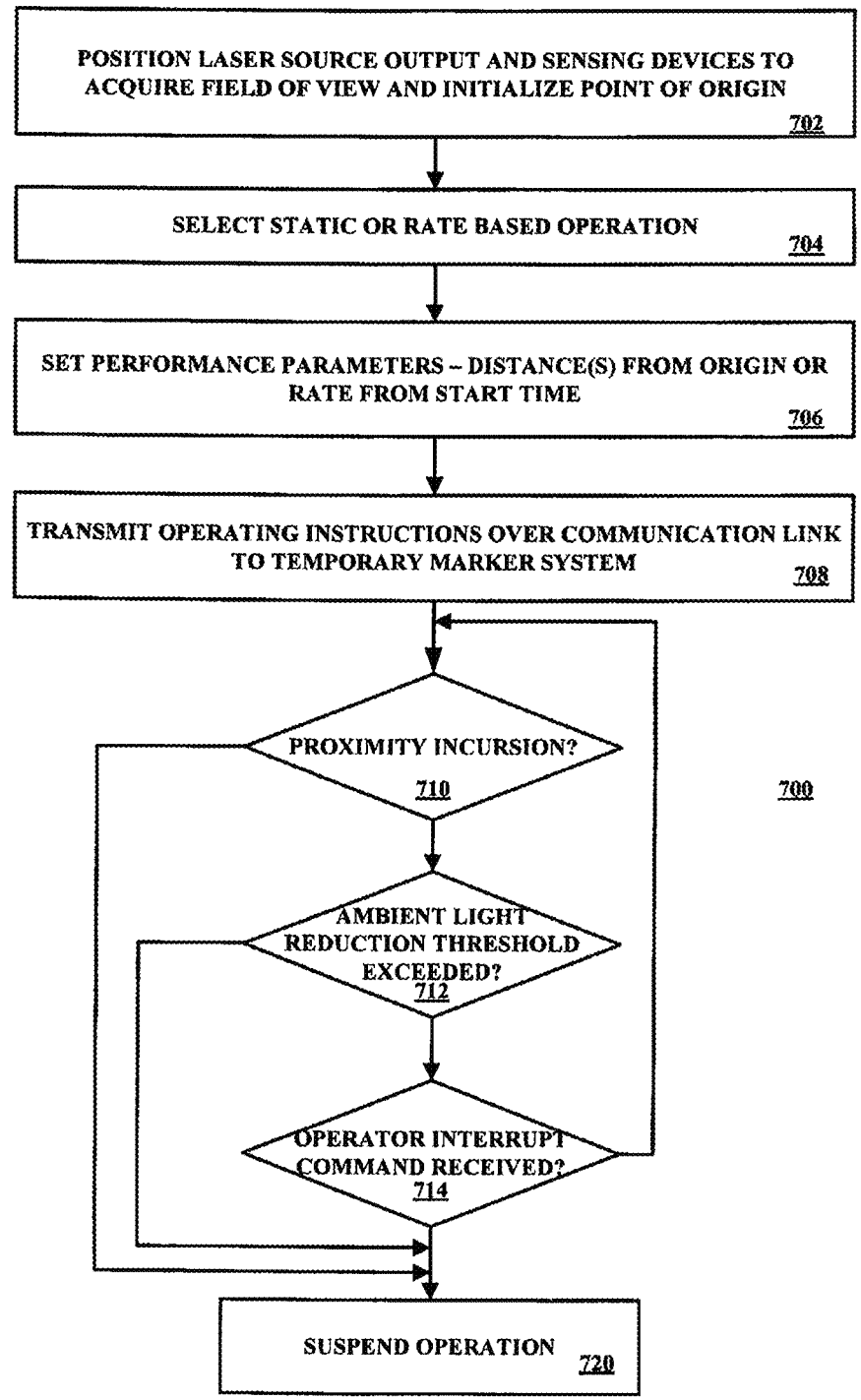
FIG. 7 is a flowchart depicting a process for operating a temporary marker projecting system so as to obtain temporary, static or dynamic markers.

Continuing with the example of FIG. 7, if the lasers of Group C are not determined to be operational at decision block 814, or after determination at block 820 that operation of those lasers has proceeded for m minutes, the process proceeds to block 822, at which point a determination is made as to whether the lasers of Group A are operational. The process then proceeds to block 1108 of FIG. 9 and is ready for the next cycle of operation.

In other embodiments consistent with the present disclosure, a camera and or algorithm and or a computer program determining the information of a still or moving object and then, based on calculations or a set of entered instructions sent to a laser line projecting apparatus mounted to a guy wire delivery system, the projecting apparatus is selectively movable along and above the center of a target surface such, for example, as an athletic field, and or stadium. In an embodiment, the projecting apparatus is dimensioned and arranged to project at least one fixed and or temporary, visible reference first down laser line or a touch down laser line onto a playing surface.

A camera and or a learning programmed computer system or a switching remote controlled wireless device consistent with present disclosure comprises a movable laser source and projector system on a guy wire structure that is dimensioned and arranged to be supported by and project onto a target on the field of play. The system may further include a remotely located larger laser source (not limited to) connected via fiber optic cable (or the actual larger laser source itself) to a mounted on a guy wire system moveable up and down the field which is supported by the movable structure, the laser source being maintained remotely (or mounted on the guy wire system itself) in another location and the laser line projector moves by the movable structure (or mounted in one or more different locations) at an elevated location relative to the target playing field surface. This allows the camera's view and laser projected source to direct optical energy (not limited to) directly downward upon the field or stadium while the movable structure (or still mounted) is maintained substantially in a first orientation relative to the target playing surface. The learning algorithm anticipates the movements of objects and things on the field in the stadium to determine the location of the projected first down or touch down laser line, (not limited to) to display a specific laser line across the field directly from overhead to show the players, officials, coaches, fans in the stands and on all the cameras different angles broadcasting the event where the usually invisible first down line really is.

Figure 13:
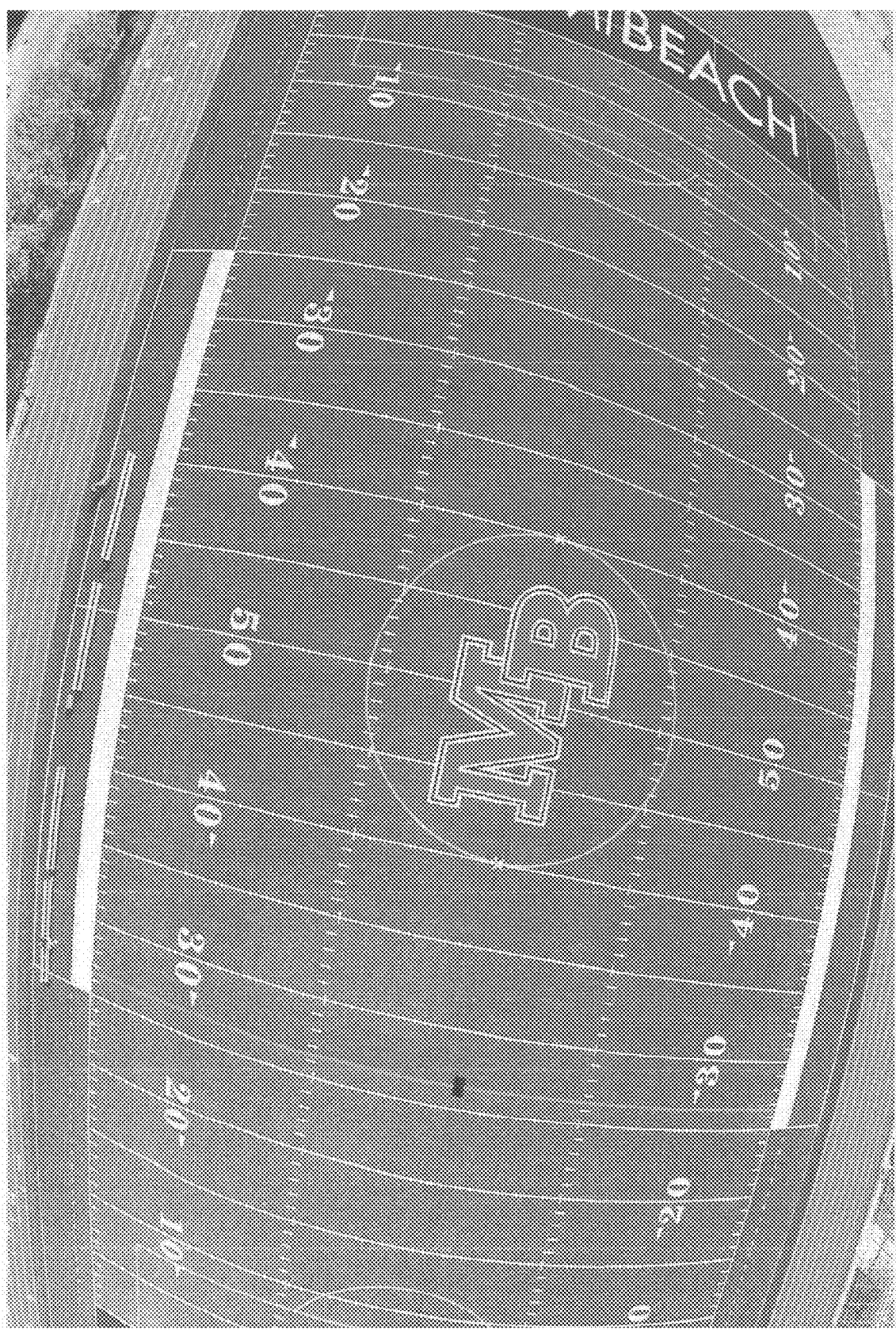
FIG. 13 depicts projection of a visible first down line onto a target surface by an overhead laser projecting apparatus suspended and moved by wires according to one or more embodiments, the projecting apparatus receiving optical energy from one or more laser source(s) by via one or more optical waveguides (e.g., optical fibers) and being movable into a location suited for projection of a reference line onto a target surface (e.g., at the exact overhead location pointed directly down required by the official location of the first down marker on a playing field).

FIG. 13 depicts projection of a visible first down line onto a target surface by an overhead laser projecting apparatus suspended and moved by wires according to one or more embodiments, the projecting apparatus receiving optical energy from one or more laser source(s) by via one or more optical waveguides (e.g., optical fibers) and being movable into a location suited for projection of a reference line onto a target surface (e.g., at the exact overhead location pointed directly down required by the official location of the first down marker on a playing field).

Figure 14:
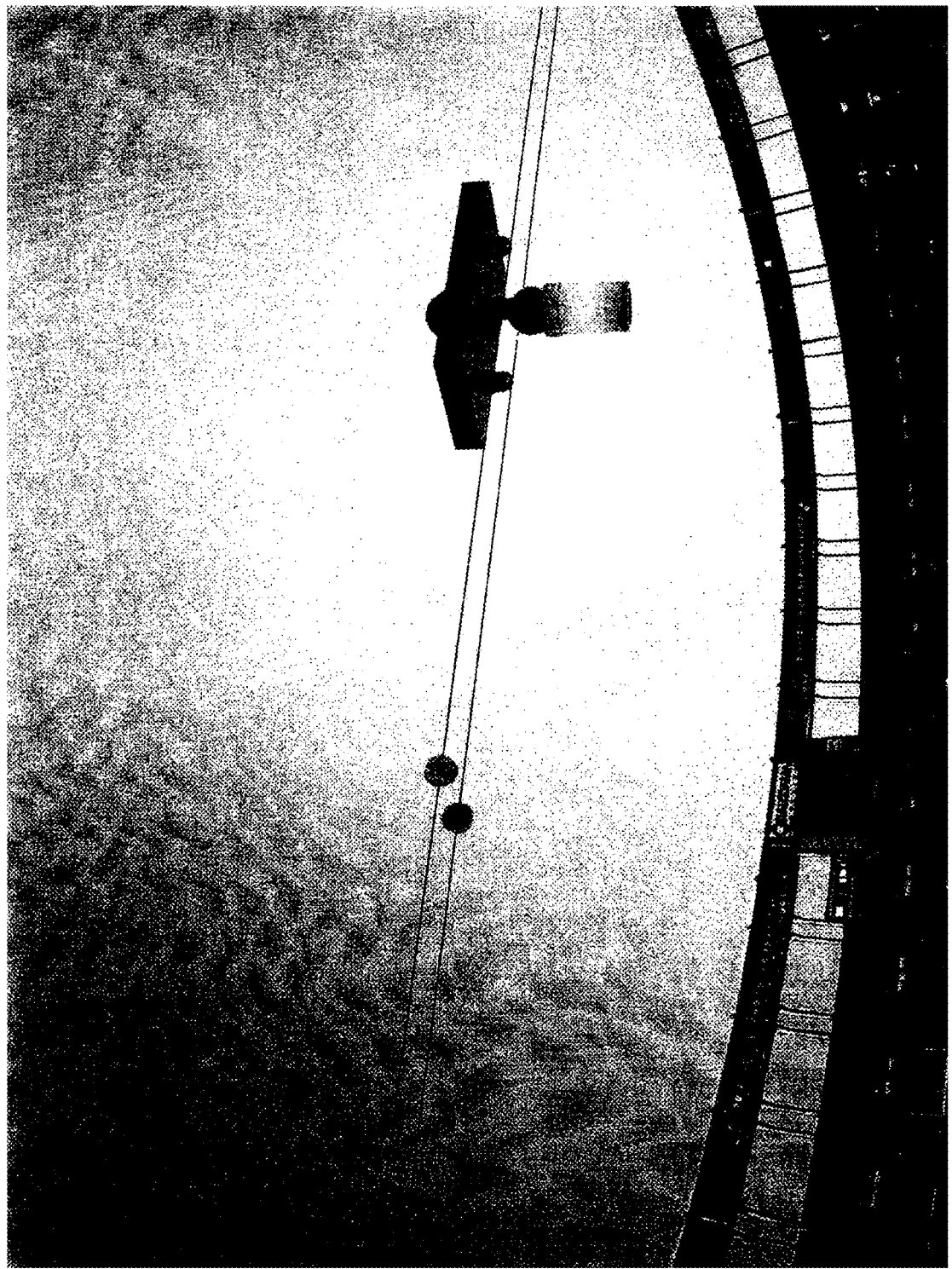
FIG. 14 depicts operation of a system according to an embodiment of the invention projecting a fiber optic fed (or no fiber optic used if the laser source is on board the moveable guy wire delivery system itself) up and down the field remotely controlled by computer moveable guy wire delivery system, first down laser line pointed onto an exact mark on the playing field. Either determined by the referee and or by the operator.

FIG. 14 depicts operation of a system according to an embodiment of the invention projecting a fiber optic fed (or no fiber optic used if the laser source is on board the moveable guy wire delivery system itself) up and down the field remotely controlled by computer moveable guy wire delivery system, first down laser line pointed onto an exact mark on the playing field. Either determined by the referee and or by the operator.

Figure 15:
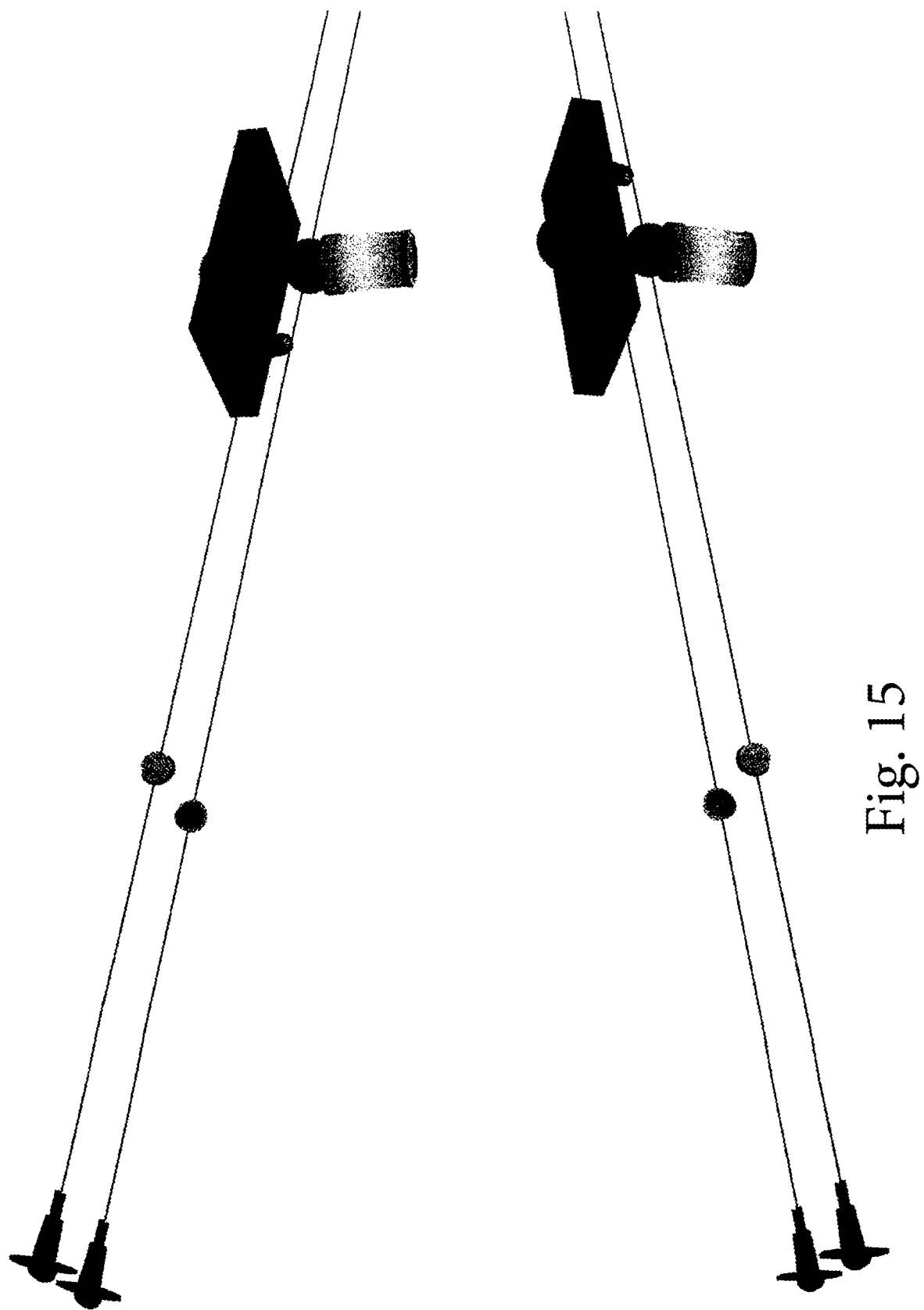
FIG. 15 is an example of system according to an embodiment of the invention travel delivery system mounted to both ends of the stadium over head so as to deliver a projected first down laser line onto the playing field for all to visibly see and use during a game.

FIG. 15 is an example of system according to an embodiment of the invention travel delivery system mounted to both ends of the stadium over head so as to deliver a projected first down laser line onto the playing field for all to visibly see and use during a game. The system provides a temporary visible reference mark upon a surface despite dynamically variable ambient lighting conditions, and comprises a laser source positional at the elevated location relative to the target surface. The laser source platform is carried by a mobile platform suspended by guidewires, the guide wires being actuated by one or more controller(s) that are connected to a computer having a processor executing instructions stored in memory of the computer to learn and anticipate directions and corresponding projected line locations based on movement and positions of the mobile platform and/or wire spooling. Based on the acquired line location data, and/or on specifically input instructions by an operator, the system is able to project a laser line or graphic onto the playing field target surface (e.g., for a first down line visible for reference purposes in a football game).

Figure 16:
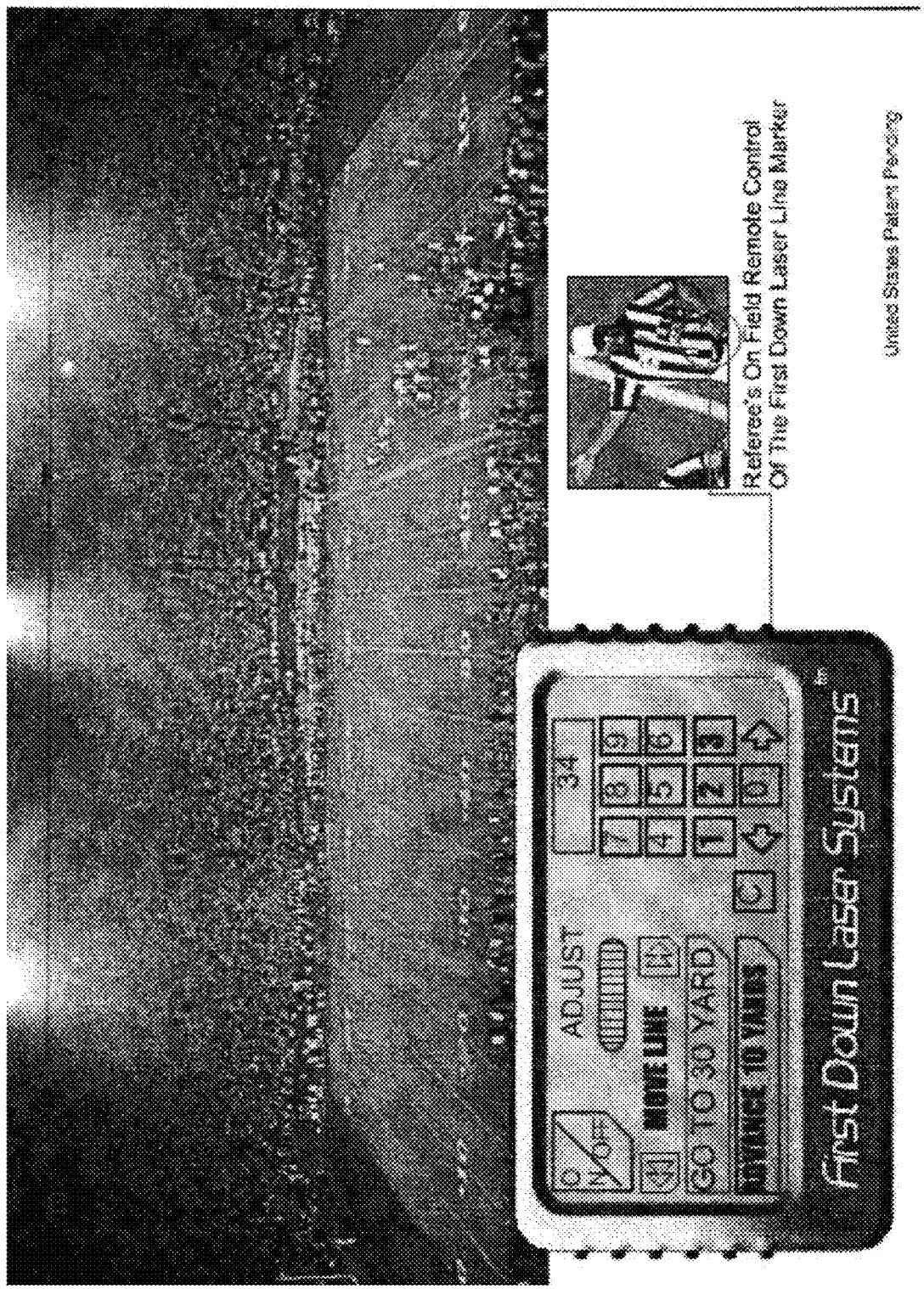
FIG. 16 is an example of a location for a suggested embodiment of a referee held controller for the laser source controlled by our computer program and fiber optic fed or not fiber optic fed using the actual laser source on board the delivery system itself, moveable up and down the length of playing field laser projector system according to an embodiment of the invention.
Figure 17:
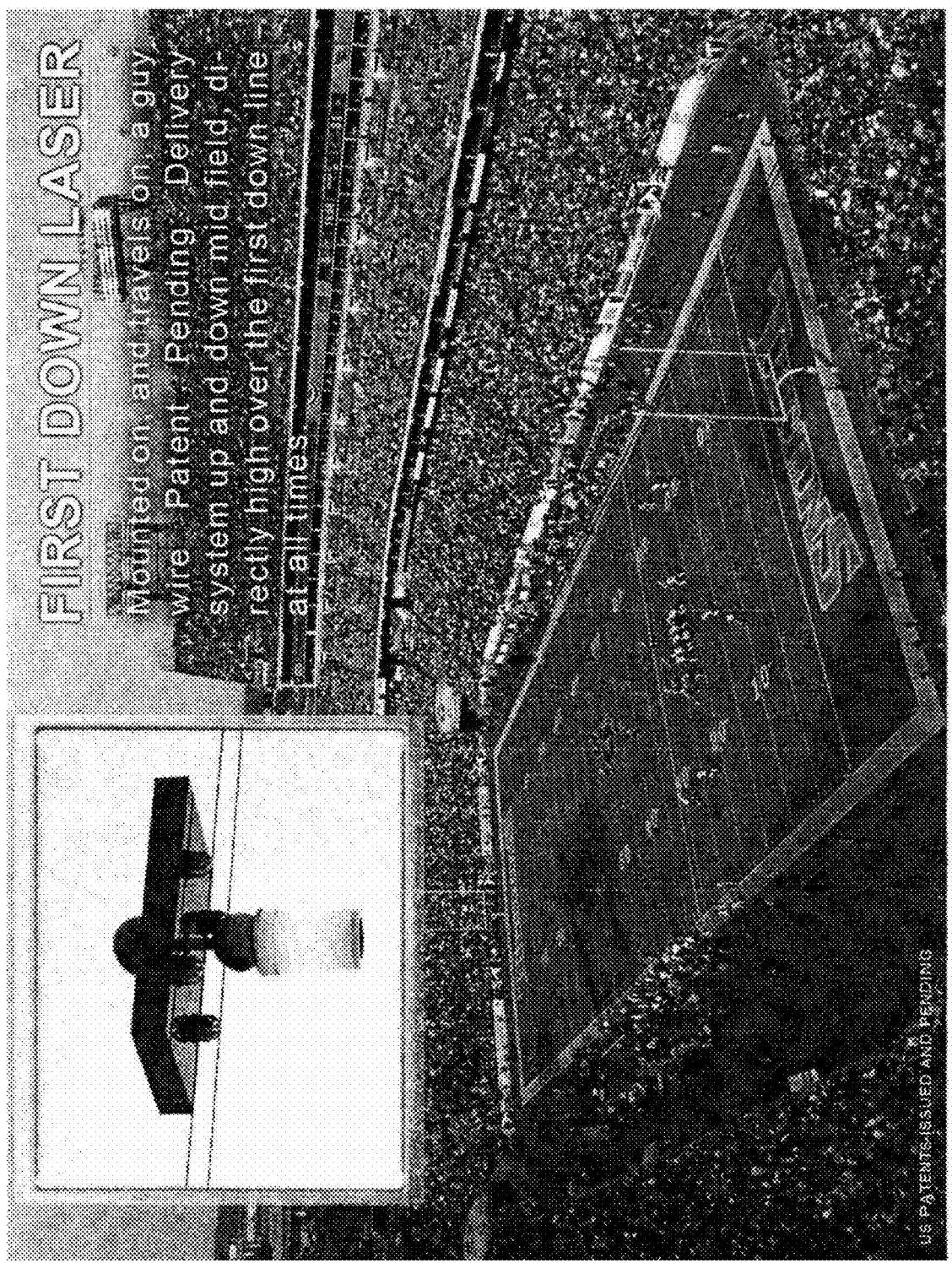
FIG. 17 is an overhead view of a predetermined projected on to the playing field for everyone in the stadium and on the TV broadcast to visibly use as a first down line and or a touch down line use reference and or to alert of a first down and or a touch down.

In some embodiments, the system of FIGS. 16 and 17 further includes a laser source positionable at an elevated location relative to the surface and operative to direct optical energy at a wavelength of between 380 nm and 750 nm upon the target surface, an ambient light sensor dimensioned and arranged to detect variations in an intensity of sunlight in a zone proximate the surface so as to approximate an intensity of sunlight or ambient light striking the target surface, and a laser source modulating system and or defusion line generator operatively associated with said ambient light sensor and operative to one of reduce and disable an output of said laser source when a level of ambient light intensity detected by said ambient light sensor falls below a selectable threshold. In an embodiment, the system projects a line downwardly in a direction orthogonal to the target surface so as to define a reference plane. An array of photosensors and/or a camera arranged to accommodate image analysis within the defined reference plane may be used to detect upon the ball breaking the plane of the laser line to give a notice of the event to alert making of the first down and or a touch down.

In some embodiments, the system of FIGS. 16 and 17 projects the aforementioned reference plane along some or a portion of a goal line. The system is further configured to detect when a ball breaks the plane of the goal line evidencing a touch down. In an embodiment, the system is used in combination with a camera algorithm on the ground to see if a knee of the player in possession of the ball had touched the ground before the ball broke the plane of the goal line (as made visible by projection of the line). Such operation enables a determination whether a touch down was scored or not. Another application of the system consistent with the present disclosure is to define a plane above and between the goal posts during a football game. Even when a ball is kicked and its path of travel is along an arc taking it higher than the physical goal posts, a system constructed in accordance with the present invention enables a determination of our whether or not a kicked ball was between the goal posts such that only a valid field goal or extra point may be awarded.

In an embodiment, a system consistent with the present disclosure comprises controlling a laser projector and or its fiber optic cable directly above a playing field for the laser source to be projected out safely away from the audience and the players on the field, by projecting the laser line for delineation from directly above overhead for the first down line to be marked on the playing field. Movement of the projector can be directed from a remote-control unit (e.g., via transmitted RF control signals or direct wire control) the movement from the zero-yard line on one side of the field end zone, to the zero-yard line on the other side of the end zone (from goal line to goal line in very small exact increments). The fiber optics connected to the laser projector mounted to the platform in a trough along the middle of the two guy wires—or a single guy wire and or without a fiber optic cable—with a stabilizing mechanism, that if using fiber optics—coils up the fiber optics feed on a reel when the projector moves in one direction, and coils out from the reel when the projector is moving in the other direction. Up field or downfield. Coiling when going down filed and unwinding the coil when going up field. This movement can be controlled manually and or by computer algorithm control.

If controlled by a computer, a system consistent with the present disclosure may be programmed to sense the marking of the tip of the ball by a referee's placement of that ball and the first down line would appear at what ever exact location is either punched in to the computer, determined by the camera or instructed verbally by the voice of the referee or operator into the system. (but not limited to these methods of controlling the line placement) A new guy wire remote controlled and operated delivery system, to mount a fiber optic fed and or not a fiber optic fed, first down laser projector over the top—along the center of a stadium and or playing field. Controlled remotely, wirelessly and or by direct wire to move the laser projector in exact increments up and down the center of the field, directly over the first down laser line marked visibly onto the playing field.

FIG. 16 is an example of a location for a suggested embodiment of a referee held controller for the laser source controlled by our computer program and fiber optic fed or not fiber optic fed using the actual laser source on board the delivery system itself, moveable up and down the length of playing field laser projector system according to an embodiment of the invention.

FIG. 17 is an overhead view of a predetermined projected on to the playing field for everyone in the stadium and on the TV broadcast to visibly use as a first down line and or a touch down line use reference and or to alert of a first down and or a touch down.

Figure 19:
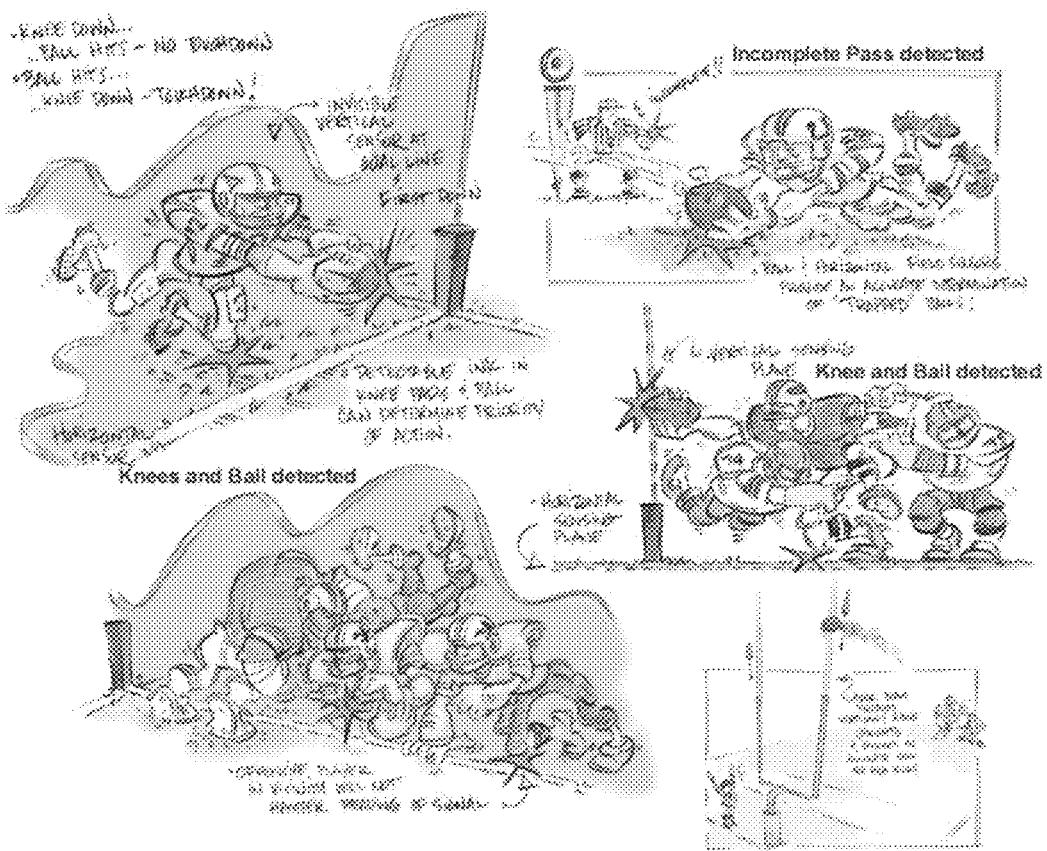
FIG. 19 is an example of the many different detection and reporting systems for this combination patent filing. Knee down, Ball hits ground, Incomplete pass detected, Ball breaks the plane of the first down and or goal line. Secure ball placement with line up line system and methods. Extra points and 3-point kickers detection and reporting of ball clearing between the goal posts.

FIG. 19 are examples views of detection systems on to the playing field for our first down laser line breaking notice, touch down goal laser line alerts with knee down first.

Figure 18:
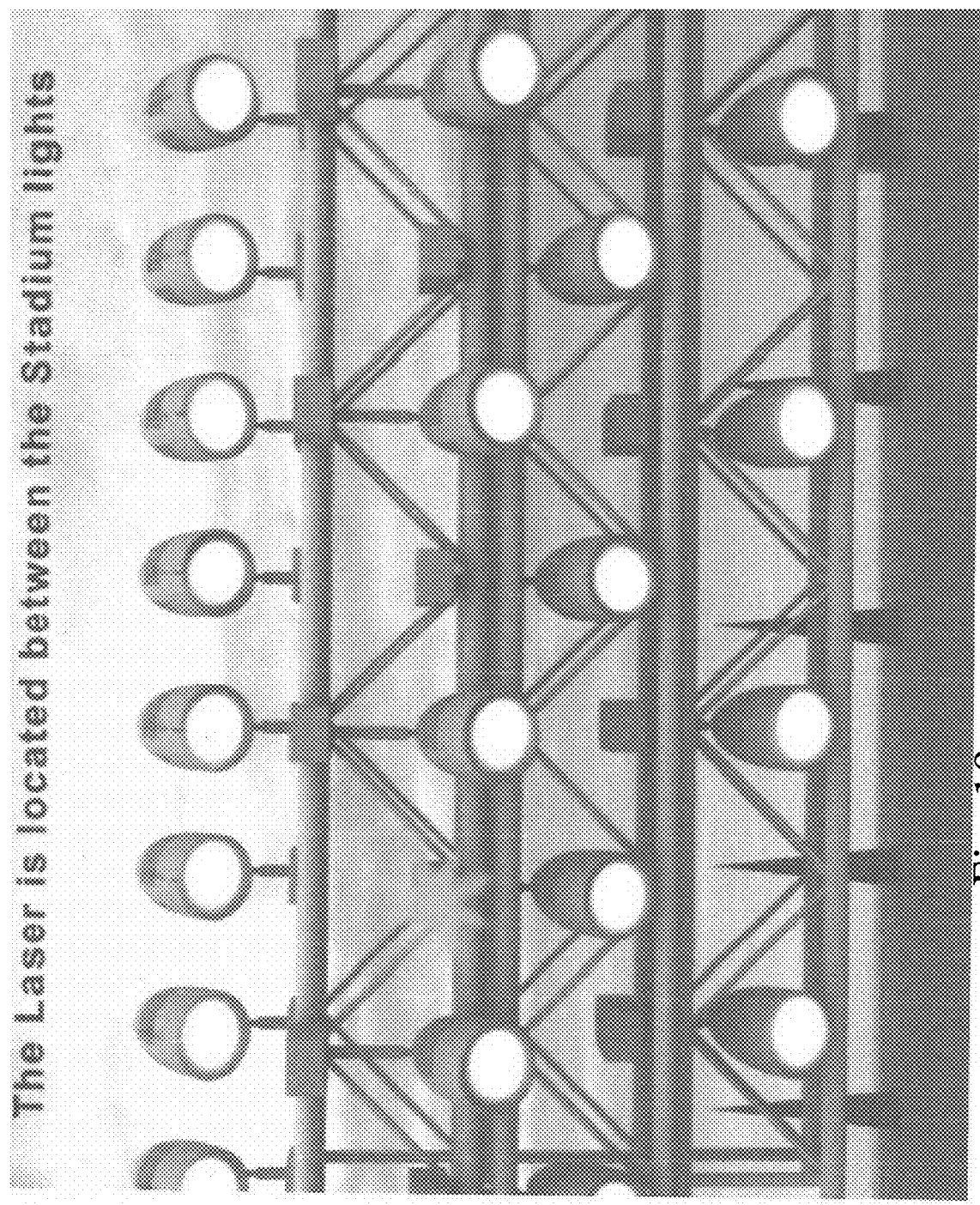
FIG. 18 is an example of a location for a laser source controlled by our program and projector system according to an embodiment of the invention.

In a further embodiment, a system adapted for use in associate with objects movable on a target surface in a cyclical fashion (e.g. football, knees, helmets, chain sets, players, cars or runners racing in laps around a track) comprises a camera and algorithm determining the information of a still or moving object (not limited to) then based on calculation's sent to a laser projecting apparatus that is selectively movable along a field and or stadium and dimensioned and arranged to project at least one temporary, visible reference graphic onto a surface. Such as system is depicted in FIG. 18 is an example of graphics projected on many objects according to an embodiment of the displaying a graphic on the tops of all objects on the filed stadium and or track; a system according to an embodiment of the invention projecting on the tops of each object car to display position in the race; According to an embodiment of the invention projecting on the tops of each object car to display position in the race; FIG. 18 is an example of a location for a laser source controlled by our program and projector system according to an embodiment of the invention; is an overhead view of a predetermined preset graphic projected on to the objects (cars) to explain position numbers in the race for each car at that particular moment in the race for fans and everyone in the stadium to visibly see. camera monitors and anticipates directional movements of the cars (objects, things and or people) frame by frame; a car in position 1 winning the race, movements off the laser graphic based on predetermined programmed learned amount of laps accomplished without fouls, number of pit stops made etc.; and is an example cars in position 3 and 4 in the race, movements off the laser graphic based on predetermined programmed learned amount of laps accomplished without fouls, number of pit stops made etc.

A camera and learning programmed system constructed in accordance with the embodiments of FIG. 18 comprises a movable structure that is dimensioned and arranged to be supported by and project onto a target surface. The system further includes a laser projected source (not limited to) supported by the movable structure, the laser source being maintained by the movable structure (or mounted in one or more different locations) at an elevated location relative to the target surface. This allows the camera's view and laser projected source to direct optical energy (not limited to) downward upon the field or stadium while the movable structure (or still mounted) is maintained substantially in a first orientation relative to the target surface. The learning algorithm anticipates the movements of objects and things on the field in the stadium or on a track, to determine their location and amount of revolutions and or trips around the track in relation to the laser graphic, (not United to) to display a specific corresponding graphic determined. Non-limiting examples of graphics which may be determined and projected include the number of revolutions, elapsed time from beginning the race, and/or a difference in pace between a given athlete and a leading athlete or applicable record (e.g., world record, event record, etc).

Figure 22:
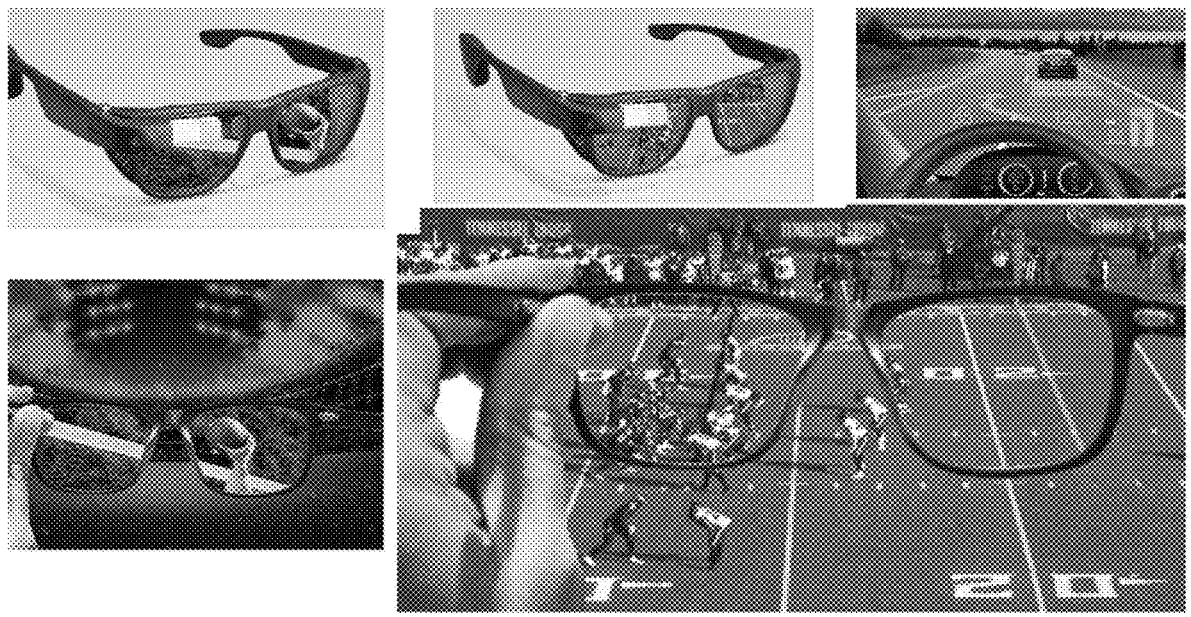
FIG. 22 is an example of my method of virtually seeing the broadcasted yellow first down line graphic everyone sees at home on TV. Only now when wearing my AR glasses, you can see the line on the field when you look at the field. The yellow virtual line will be on the field like in the TV broadcast. Allowing everyone in the stadium to see were the first down line to gain it.
Figure 24:
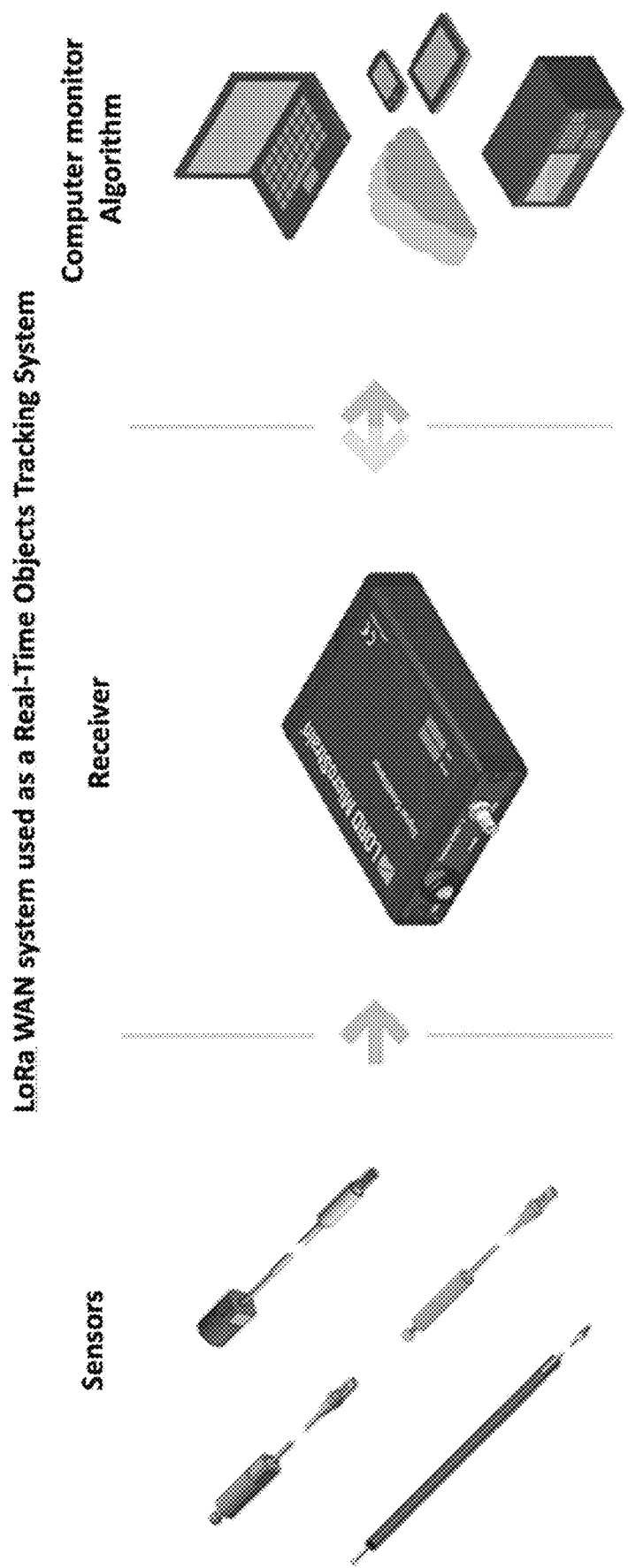

FIG. 22 is an example of a method of an Augmented Reality First-down Line viewer. Allows the players, coaches, referees, officials and fans in the stadium to all see what we now are used to seeing on a football television telecast at home. The first down yellow line. A system and method claim to Install in those polarized shields the players put in their helmets. It would be an AR (augmented reality) system, which would show them the first down yellow line graphic now painted on the games television broadcast, as if it were there right in front of them. Players, referees, officials, coaches and fans in the stadium will all be able to have AR glasses, to be able to see use and follow the first down graphic yellow line, that is now seen on the television broadcast anyway, it will be shown to them, all as if it were real. This is a simplified bare bones narrow use method claim AR version for this specific reason.

First down line lenses, glasses or goggles, that show you where the yellow first down graphic line is, at all times. As the broadcast moves and positions the yellow graphic line, so it will also be seen in the AR goggles. Allowing everyone in the stadium wearing these polarized shield, glasses or goggles to see and utilize the first downs position on the field. This would be easy to implement AR system. This would be patentable because, most things AR are static, they don't move. In this case, the first down yellow graphic line needs to follow up and down the field (as on the television broadcast) in the AR lenses glasses or goggles, is always repositioning and moving. So, to follow that moving repositioned yellow graphic line, and present the first down yellow graphic line as an AR element, is patentable. Our real first down Laser line on the field, is the best. But, we also want protect the augmented reality work around, and offer it to the NFL™ and college football.

Figure 20:
FIG. 20 is an example of the control on and off switching of the laser projection first down line on the field and in the control booth, by the officials. A ring on the official's finger controls the on off of the lines.
Figure 21:
FIG. 21 is an example of the controlling computer device off the field, of the overall operation of the Combination systems and methods.

The slightest of Head Movement controls the line but only activated when player is in the caution zone and in the caution frames. FIG. 20 shows an example of a ring on the fingers of the referees on and off the field, to turn the first down laser line and line to line up on and off instantly, as needed wirelessly by remote control.

Helmet/Head Directional OFF Camera Switch
  Straight—line on
  Start turning left—line off
  Straight—line on
  Start turning right—line off
  Helmet/Head Directional Movement Camera Algorithm Switch 120 frames per second camera (normal video is 30 frames per second) monitoring all players Helmet/head when in the 36" inches high by 36" inches wide by 53.3 yards across the field caution ZONE, will instantly shut OFF the laser line during frames 40 (which is the starting motion to turning and looking in the direction of the projector, and 120 which is looking directly towards the projector) and put the line back ON when clear of the caution ZONE or out of the caution FRAMES.
Two Criteria for the caution camera to activate
1—In ZONE
2—In FRAMES
  Helmet/head in laser line caution ZONE (36"×36"×53.3 yards across) if players start to or are looking towards the projector laser line is instantly OFF (120 frames per second—at FRAME 40 to 120 frames the line is off, from frame 1 to frame 39 the line is ON) Line ON during FRAMES 1 to 39 (and when out of ZONE) as example only Line OFF during FRAMES 40 to 120 as example only.

By projecting a laser line over another laser line (each other) from both sides of the field, one line may be on while the other line may be off. Always showing a line to beat.

If another player is blocking the beam and camera (both beam and camera may be coming from the same place) that means the player on the ground is also blocked from the beam if blocked from the camera.

While given components of the system have been described separately, one of ordinary skill also will appreciate that some of the functions may be combined or shared in given instructions, program sequences, code portions, and the like. The invention being thus described, it will be obvious that the same may be varied in many ways. Such variations are not to be regarded as a departure from the spirit and scope of the invention, and all such modifications as would be obvious to one skilled in the art are to be included within the scope of the following claims.

In ALL FIGURES shown attached here are examples of preferred suggested embodiments in sports and industry uses for a temporary or permanent safe line projection system comprises a stationary or movable structure that is dimensioned and arranged to be supported by and project upwardly from an athletic field surface (or other surfaces needing delineation). A laser source is supported by the movable or stationary structure and is maintained by the movable or stationary structure at an elevated location relative to the athletic field surface (or other surface requiring delineation). This allows the laser source to direct safe optical energy downward upon the field while the movable or stationary structure is maintained substantially in a first orientation relative to the athletic field surface (or other surfaces desiring delineation). A sensing arrangement is operative to disable the laser source or modulate its output depending upon proximity of users to the system or its output and upon ambient lighting conditions, as the case may be. A ring switch controller to wirelessly turn off and on instantly as needed.

All the attached examples of suggested preferred embodiments (but not limited to these named) and uses in ALL FIGURES must conform to all the rules and regulations set by the governing branch of the FDA called the CDRH. This patent filing adheres to those rules and regulations by a new safe projection of strong laser sources mounted and disseminated different angled and located beam(s) to keep the intense brightness but eliminate all danger. None of the previous patent filings and or prior art has come close to these new safety regulations, and this patent filing makes these systems safe for actual use.

An important version of the inventive concept can be fairly described as a combination detection and reporting system and methods of a temporary or permanent safe line projection system comprises a stationary or movable structure that is dimensioned and arranged to be supported by and project upwardly from an athletic field surface (or other surfaces needing delineation or detections and reporting). A laser source is supported by the movable or stationary structure and is maintained by the movable or stationary structure at an elevated location relative to the athletic field surface (or other surface needing delineation or detection and reporting). This allows the laser source to direct safe optical energy downward upon the field while the movable or stationary structure is maintained substantially in a first orientation relative to the athletic field surface (or other surfaces desiring delineation or detection and reporting).

A sensing arrangement is operative to disable the laser source or modulate its output depending upon proximity of users to the system or its output and upon ambient lighting conditions, as the case may be. Paint sensors in the ball, and on the knees of the players to detect i.) breaking the plane for a first down or goal, for a touchdown ii.) knee down before or after catch, first down or goal touch down iii.) Laser "line up line" to quick and accurate ball placement. Safer and easier for players to see where the first down is. 100% Accuracy and instant ball placement for the game, its referees and officials who are calling the game. Enhance in-stadium fan experience (with a visible line to gain on the actual field itself) Helps to prevent spine, head, neck and concussion injuries by allowing the players to see the line they are going for, instead of contorting to see the side line makers to make a first down. Shorten the overall game time, by not having to bring out the chain system method they use now. Cut out wasted time finding the correct placement of the ball with a line up laser line, and always know visibly, when a player makes a first down. Can you imagine playing the game of football without a visible goal line? Of course not. Then the first down line should be visible too, and both should be detectable as well. This new novel and unique invention will do all that and more. There are more first down calls made in a football game, than there are goal line calls.

Yet the goal line is visible, and the first down line is not, neither has a detection and reporting system to date. Augmented reality first-down line viewer allows the players, coaches, referees, officials and fans in the stadium to all see what we now are used to seeing on a football television telecast at home. The first down yellow line. A system and method claim to Install in those polarized shields the players put in their helmets. It would be an AR (augmented reality) system, which would show them the first down yellow line graphic now painted on the games television broadcast, as if it were there right in front of them.

Players, referees, officials, coaches and fans in the stadium will all be able to have AR glasses, to be able to see use and follow the first down graphic yellow line, that is now seen on the television broadcast anyway, it will be shown to them, all as if it were real. This is a simplified bare bones narrow use method claim AR version for this specific reason. First down line lenses, glasses or goggles, that show you where the yellow first down graphic line is, at all times. As the broadcast moves and positions the yellow graphic line, so it will also be seen in the AR goggles.

Allowing everyone in the stadium wearing these polarized shield, glasses or goggles to see and utilize the first downs position on the field. This would be easy to implement AR system. This would be patentable because, most things AR are static, they don't move. In this case, the first down yellow graphic line needs to follow up and down the field (as on the television broadcast) in the AR lenses glasses or goggles, is always repositioning and moving. So, to follow that moving repositioned yellow graphic line, and present the first down yellow graphic line as an AR element, is patentable. Our real first down Laser line on the field, is the best.

An important version of the present invention can be fairly characterized with the following components for a combination detection and reporting first down laser line system and method for line up accuracy for goal posts, goal line, first down line, knee down and line up for accurate ball placement after every play:

1. The safe first down laser line projected directly onto the playing field. Computer algorithm controlled up and down the field. To eliminate or augment the present old fashioned and time-consuming flag chain sets measurements.
2. Knee sensor (painted RFID on the uniform knees of all players) to detect and report when a player's knee touches or hits the playing field, before or after the ball is caught, goal line is broken or a first down is made.
3. Painted RFID ball sensor, to track the balls location for catches, touchdowns, first downs and extra points and 3 points kicking between the goal posts.
4. Goal line RFID sensor, for touchdown before or after the knee hits the ground.
5. First down line RFID sensor, to detect knee position when ball breaks the plane of the first down laser line.
6. Goal posts RFID sensors, for kicking, to accurately detect and report a good kick between the goal posts.
7. Augmented Reality Augmented Reality First down Line viewer.

Allows the players, coaches, referees, officials and fans in the stadium to all see what we now are used to seeing on a football television telecast at home. The first down yellow line.

A system and method claim to Install in those polarized shields the players put in their helmets. It would be an AR (augmented reality) system, which would show them the first down yellow line graphic now painted on the games television broadcast, as if it were there right in front of them.

Players, referees, officials, coaches and fans in the stadium will all be able to have AR glasses, to be able to see use and follow the first down graphic yellow line, that is now seen on the television broadcast anyway, it will be shown to them, all as if it were real.

This is a simplified bare bones narrow use method claim AR version for this specific reason.

First down line lenses, glasses or goggles, that show you where the yellow first down graphic line is, at all times. As the broadcast moves and positions the yellow graphic line, so it will also be seen in the AR goggles. Allowing everyone in the stadium wearing these polarized shield, glasses or goggles to see and utilize the first downs position on the field. This would be easy to implement AR system. In this case, the first down yellow graphic line needs to follow up and down the field (as on the television broadcast) in the AR lenses glasses or goggles, is always repositioning and moving.

To follow that moving repositioned yellow graphic line, and present the first down yellow graphic line as an AR element. The real first down Laser line on the field, is the best.

Another version of the inventive concept can be fairly described as a complete on the field football real-time monitor in a computer screen grid, with the algorithm knowing within a 1/16th of an inch were the balls position is at all times on the field. And the balls relationship to the ground, the goal posts, the goal line and the first down flag set markers. When the ball should break the plane of any of these sensors, the computers algorithm will monitor, display and report that information in real time. All while monitoring the players knees sensors location in real time, as well to coordinate within the algorithm whether or not the players knee was down before the ball broke the plane, or after the ball broke the plane. If a legal or not legal catch, first down, goal or kick is detected in our algorithm, it will instantly in real time report that to the computer grid and officials referees on the field.

Fair catch.
Touch down.
First down.
Kick is good.
Many ways the system will be tracking:
3 Camera tracking
Passive RFID, Active RFID, Radar, Sonic, GPS tracking
Radium, Ink, Paint, LoRa WAN accelerometers sensors tracking Antennas with boosters planted within the ground every as many needed feet under the football field, as receivers and transmitters to base.

This above described (6) of the methods of my (9) nine complete real-time football game monitor and reporting algorithm computer system.

1—Ball monitor to algorithm
2—Knee down monitor to algorithm
3—Fair catch ground monitor to algorithm
4—Goal line monitor to algorithm
5—First down flag sets monitor to algorithm
6—Kicker goal posts monitor
7—A/R yellow line viewer, lenses and glasses
8—First Down Laser Line on field
9—Laser line up line for ball placement speed and accuracy.

The above numbers 8 and 9 are remotely controlled on and off by the referees and officials on the field, and in the control booth.

The above number 7 location of the yellow line is controlled by the broadcast director in the production truck to our in-stadium broadcast to AR lenses and glasses.

The above numbers 1-6 are all controlled and coordinated by the computer algorithm in real time. Algorithm knows in real time the balls location and positions, players knees locations and positions, goal lines location, first down flag sets locations and positions, the goal posts location and position, and the grounds location and position in relation to the players knees and the ball.

There are several ways to detect the ball, the goal line, the first down flag sets position on the field, the goal posts, the ground and the players knees on the field. All controlled on a computer algorithm grid.

Sensors that collect and track data may be used like inferred, GPS, ink, paint, Radium, Images, air pocket, Rubber, leather, RFID and other item motion trackers.

Light printed RFID custom sensors can be printed on the inside leather of the ball knee pads etc. A very small light RFID printed patch that can be put in the ball as well to track. The method of tracking in conjunction with the algorithm to seamlessly work with the ground, knee pads sensors, goal line, first down flag sets and goal posts. It could be ink paint or Radium.

With a sensor, a machine observes the environment and information can be collected. A sensor measures a physical quantity and converts it into a signal. Sensors translate measurements from the real world into data for the digital domain.

1—Combination of ink and cameras.

How a UV-marker works. The UV LEDs used to read the message written by UV markers emits near-ultraviolet light.... When the black light falls upon the UV-visible ink, it makes the ink fluoresce, where it emits visible light and make the message readable for human eyes.

2—Combination of paint and cameras.

UV rays from Sunlight or even Black Light UV will supercharge this paint, incandescent and LED takes a little longer.

3—Radium and radiation detection instruments.

Until the 1960s, various military and consumer products were manufactured using a radium-based paint that glows in the dark. We refer to these products as radium luminous devices . . . . Only a radiation detection instrument can confirm if a device contains radium luminous compounds.

4—Cameras placed around the field alone can track and report to an algorithm a football location anywhere on the field of play.

Cameras with an object tracking feature are typically able to track moving objects. This is done thanks to stills and motion sensors.

5—Automatic GPS object detection and tracking;

Tracking the football by GPS coordinates in real time.

6—Image tracking of the ball however this doesn't work if the ball is covered or in a pile of players.

The utilization of two cameras enables us to detect a small object with the stationary camera while tracking it with the second moving camera.

7—x-ray tracking of the air in the Blatter of the ball. A sensor is fixated on the air trapped in the blaster of the ball. Used in deep sea diving to locate pockets of air.

8—Rubber from the Blatter of the ball is detectable via rubber finding sensors placed around the playing field. These detectors look for this specific rubber used in the Blatter and tracks it.

9—Heat sensing cameras detect that specific internal temperature of the ball and tracks it.

10—Wireless 3 position tracking and monitoring of the ball. The ball starts out at one point, and is tracked from then on.

11—A Newley developed food ingredient can be monitored.

This sensor is the "size of a grain of sand, and is made up of ingredients found in food," according to Otsuka. Coming into contact with fluids, the sensor is activated and communicates this to the MyCite Detector.

12—anything can be tracked in real time by simply taking its coordinates and following the coordinates movements as long as it's in a controlled area like a football field.

LoRa WAN Accelerometer is yet another example.

An important version of the device can be fairly described as a sports detection and reporting method controlled by a primary computing device comprising the steps: providing a tracking array projecting upward from an athletic field surface where the tracking array is comprised of at least one of: an optical camera, an RFID reader, a signal receiver, a radiation detector, an X-ray tracker, a thermal camera and an audio sensor. And, providing a laser source projecting downward onto the athletic field surface. And, providing a sensing array detecting a proximity of a player and detecting a strength of ambient light on the athletic field surface. While modulating the output of the laser source factoring the proximity of the player and the strength of the ambient light detected by the sensing array. And, providing a ball with an integral marker and attaching an applied marker to the player (or many players). And, detecting with the tracking array a location of the ball by locating the integral marker. And, detecting with the tracking array a location of the player by locating the applied marker. Then, determining, based on the detected location of the ball and the detected location of the player, a status information comprised of at least one of: whether a first down plane was broken, whether a goal plane was broken, where the player was down and when the player was down. Then, projecting a visible laser line onto the athletic field surface at at least one of: a line of scrimmage, a first down line, a line where the ball went down and a line where the player went down. Optionally, the marker is attached to the player's knee. Optionally provided is a lens that enhances a visibility factor of the visible laser line is provided to at least one of: a referee, a player, a coach, a fan and a camera. The projected laser line may be colored, textured, blinking or throbbing to identify a nature of the projected laser line. Optionally, the integral marker of the ball is at least one of: an RFID tag, a UV light, an applied image, an applied color, an applied reflective patch, an applied design, an applied low level radiation, a GPS tracker, a LoRa WAN, an accelerometer and triangular location tracking. Optionally, applied marker of the player is at least one of: an RFID tag, a UV light, an applied image, an applied color, an applied reflective patch, an applied design, an applied low level radiation, a GPS tracker, a LoRa WAN, an accelerometer and triangular location tracking. Optionally, the tracking array is comprised of a plurality of sensors spaced on and around the athletic field surface. Optionally, the athletic field surface further includes a periphery of the athletic field surface. Optionally, the real-time reporting the location of the ball and the location of the player to a remote computing device in real time. Optionally, projecting the visible laser line onto the athletic field surface occurs contemporaneously with detecting the location of the player and detecting the location of the ball. Optionally, determining the status information occurs contemporaneously with detecting the location of the player and the location of the ball. Optionally, determining a play information based on at least one of the status information, the location of the ball and the location of the player, where the play information is at least one of: determining a knee down condition, determining a ball in or out of bounds condition; determining a goal achieved condition And, determining a first down achieved condition, determining a fair catch condition and determining an achieved field goal condition; and reporting the play information to the remote computing device in real time.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

I claim:

1. A sports detection and reporting method controlled by a primary computing device comprising the steps:
   providing a tracking array projecting upward from an athletic field surface;
   the tracking array is comprised of at least one of: an optical camera, an RFID reader, a signal receiver, a radiation detector, an X-ray tracker, a thermal camera and an audio sensor;
   providing a laser source projecting downward onto the athletic field surface;
   providing a sensing array detecting a proximity of a player and detecting a strength of ambient light on the athletic field surface;
   modulating the output of the laser source factoring the proximity of the player and the strength of the ambient light detected by the sensing array;
   providing a ball with an integral marker;
   attaching an applied marker to the player;
   detecting with the tracking array a location of the ball by locating the integral marker;
   detecting with the tracking array a location of the player by locating the applied marker;
   determining, based on the detected location of the ball and the detected location of the player, a status information comprised of at least one of: whether a first down plane was broken, whether a goal plane was broken, where the player was down and when the player was down;
   projecting a visible laser line onto the athletic field surface at at least one of: a line of scrimmage, a first down line, a line where the ball went down and a line where the player went down.

2. The sports detection and reporting method of claim 1 further characterized in that the marker is attached to the player's knee.

3. The sports detection and reporting method of claim 1 further characterized in that a lens that enhances a visibility factor of the visible laser line is provided to at least one of: a referee, a player, a coach, a fan and a camera.

4. The sports detection and reporting method of claim 1 further characterized in that the projected laser line is colored to identify a nature of the projected laser line.

5. The sports detection and reporting method of claim 1 further characterized in that the integral marker of the ball is at least one of: an RFID tag, a UV light, an applied image, an applied color, an applied reflective patch, an applied design, an applied low level radiation, a GPS tracker, a LoRa WAN, an accelerometer and triangular location tracking.

6. The sports detection and reporting method of claim 1 further characterized in that the applied marker of the player is at least one of: an RFID tag, a UV light, an applied image, an applied color, an applied reflective patch, an applied design, an applied low level radiation, a GPS tracker, a LoRa WAN, an accelerometer and triangular location tracking.

7. The sports detection and reporting method of claim 1 further characterized in that the tracking array is comprised of a plurality of sensors spaced on and around the athletic field surface.

8. The sports detection and reporting method of claim 1 further characterized in that the athletic field surface further includes a periphery of the athletic field surface.

9. The sports detection and reporting method of claim 1 further comprising: in that in real-time reporting the location of the ball and the location of the player to a remote computing device in real time.

10. The sports detection and reporting method of claim 1 further characterized in that projecting the visible laser line onto the athletic field surface occurs contemporaneously with detecting the location of the player and detecting the location of the ball.

11. The sports detection and reporting method of claim 10 further characterized in that determining the status information occurs contemporaneously with detecting the location of the player and the location of the ball.

12. The sports detection and reporting method of claim 1 further comprising: determining a play information based on at least one of the status information, the location of the ball and the location of the player, where the play information is at least one of: determining a knee down condition, determining a ball in or out of bounds condition; determining a goal achieved condition; determining a first down achieved condition, determining a fair catch condition and determining an achieved field goal condition; and reporting the play information to the remote computing device in real time.

\* \* \* \* \*